United States Patent
Picard et al.

(10) Patent No.: US 12,203,885 B2
(45) Date of Patent: Jan. 21, 2025

(54) METHODS AND SYSTEMS FOR DETECTING AND QUANTIFYING A TARGET ANALYTE IN A SAMPLE BY NEGATIVE ION MODE MASS SPECTROMETRY

(71) Applicant: PHYTRONIX TECHNOLOGIES INC., Québec (CA)

(72) Inventors: Pierre Picard, Québec (CA); Serge Auger, Lévis (CA)

(73) Assignee: PHYTRONIX TECHNOLOGIES INC., Québec (CA)

( * ) Notice: Subject to any disclaimer, the term of this patent is extended or adjusted under 35 U.S.C. 154(b) by 308 days.

(21) Appl. No.: 17/759,787

(22) PCT Filed: Jan. 29, 2021

(86) PCT No.: PCT/CA2021/050104
§ 371 (c)(1),
(2) Date: Jul. 29, 2022

(87) PCT Pub. No.: WO2021/151209
PCT Pub. Date: Aug. 5, 2021

(65) Prior Publication Data
US 2023/0093230 A1    Mar. 23, 2023

Related U.S. Application Data

(60) Provisional application No. 62/968,490, filed on Jan. 31, 2020.

(51) Int. Cl.
*G01N 27/623*    (2021.01)
*G01N 27/624*    (2021.01)

(52) U.S. Cl.
CPC ......... *G01N 27/623* (2021.01); *G01N 27/624* (2013.01)

(58) Field of Classification Search
CPC . G01N 27/623; G01N 27/624; H01J 49/0027; H01J 49/0031; H01J 49/0049;
(Continued)

(56) References Cited

U.S. PATENT DOCUMENTS

| 9,209,003 B2 | 12/2015 | Auger et al. |
| 2014/0291505 A1* | 10/2014 | Auger ................. H01J 49/0445 250/288 |

FOREIGN PATENT DOCUMENTS

| WO | WO 2011/072152 | 6/2011 |
| WO | WO 2018/223111 | 12/2018 |
| WO | WO-2018223111 A1 * | 12/2018 ............ H01J 49/049 |

OTHER PUBLICATIONS

Hassan, Isra et al. "Competitive Deprotonation and Superoxide [$O_2$-•)] Radical-Anion Adduct Formation Reactions of Carboxamides under Negative-Ion Atmospheric-Pressure Helium-Plasma Ionization (HePI) Conditions." *Journal of the American Society for Mass Spectrometry* vol. 27,3 (2016): 394-401.

(Continued)

*Primary Examiner* — David E Smith
*Assistant Examiner* — Hsien C Tsai
(74) *Attorney, Agent, or Firm* — Parker Highlander PPLC

(57) ABSTRACT

Laser diode thermal desorption coupled with tandem mass spectrometry systems and methods are described to detect at least one target analyte in a sample by negative ion mode mass spectrometry. For instance, the system and method involve desorbing a sample prepared for mass spectrometry analysis by laser diode thermal desorption to obtain a desorbed sample, and then ionizing the desorbed sample under conditions to generate an ionized analyte flow comprising a superoxide radical anion ($O_2.^-$) adduct detectable by negative ion mode mass spectrometry; and then detecting (Continued)

the $O_2.^-$ adduct by negative ion mode mass spectrometry, to thereby detect the target analyte.

21 Claims, 12 Drawing Sheets

(58) Field of Classification Search
CPC .... H01J 49/168; H01J 49/107; H01J 49/0431; H01J 49/0463; H01J 49/0445
See application file for complete search history.

(56) References Cited

OTHER PUBLICATIONS

Hassan, Isra et al. "Oxidative Ionization Under Certain Negative-Ion Mass Spectrometric Conditions." *Journal of the American Society for Mass Spectrometry* vol. 28,2 (2017): 270-277.
International Search Report and Written Opinion issued in International Application No. PCT/CA2021/050104, dated Apr. 29, 2021.

\* cited by examiner

_(1)_

METHODS AND SYSTEMS FOR DETECTING AND QUANTIFYING A TARGET ANALYTE IN A SAMPLE BY NEGATIVE ION MODE MASS SPECTROMETRY

RELATED APPLICATION

This application is a national phase application under 35 U.S.C. § 371 of International Application No. PCT/CA2021/050104, filed Jan. 29, 2021, which claims priority under applicable laws to U.S. provisional application No. 62/968,490 filed on Jan. 31, 2020, the content of which 0 are incorporated herein by reference in its their entirety for all purposes.

TECHNICAL FIELD

The present application generally relates to the field of mass spectrometry, and more particularly, to methods and systems for detecting and quantifying a target analyte in a sample by negative ion mode mass spectrometry.

BACKGROUND

Mass spectrometry (MS)-based assays coupled with chromatographic separation are commonly relied upon for trace compound detection, identification and quantification in complex or heterogeneous matrices. Although these analytical methods provide relatively high selectivity and sensitivity, they often require sample preparation steps increasing both analysis time and costs. These preparation steps are generally performed to reduce matrix effects and/or to increase sensitivity and can include a preconcentration and/or isolation (extraction) of target compounds.

New developments in the field have led to considerably faster analytical techniques for the direct analysis of samples. Direct analysis of samples reduces the "per sample" analysis time and costs by eliminating the need for chromatographic separation and by reducing sample preparation steps required for analysis. Direct analysis of samples uses ambient ionization techniques, such as desorption electrospray ionization (DESI), atmospheric pressure matrix-assisted laser desorption/ionization (AP-MALDI), and direct analysis in real time (DART) coupled with an MS-based assay. Although these techniques generate a great deal of interest because of their efficiency when compared to more conventional MS-based methods, they are still limited by several factors, namely affecting the "limit of quantification" (LOQ), their accuracy, linearity and interferences.

More recently, biological samples were analyzed by a laser diode thermal desorption (LDTD®) and atmospheric pressure chemical ionization (APCI) coupled to MS (U.S. Pat. No. 9,209,003 B2 (Auger et al.) (hereinafter US'003).

However, many challenges still exist in the detection, identification and quantification of trace compounds in complex or heterogeneous matrices.

SUMMARY

According to one aspect, the present technology relates to a method for detecting at least one target analyte in a sample using negative ion mode mass spectrometry, the method comprising the steps of:
providing a sample prepared for mass spectrometry analysis;
desorbing at least a portion of the sample prepared for mass spectrometry analysis by laser diode thermal desorption (LDTD) to obtain a desorbed sample;
ionizing the desorbed sample under conditions to generate an ionized analyte flow comprising a superoxide radical anion ($O_2.^-$) adduct detectable by negative ion mode mass spectrometry; and
detecting the superoxide radical anion ($O_2.^-$) adduct by negative ion mode mass spectrometry to thereby detect the target analyte.

In one embodiment, the target analyte comprises at least one functional group selected from the group consisting of a tertiary alcohol, a phenol, a conjugated ketone and a carboxamide having an N—H functionality.

In another embodiment, the method further comprises drying a sample to remove solvent, thereby obtaining the sample prepared for mass spectrometry.

In another embodiment, the method further comprises carrying the desorbed sample by a carrier gas flow through a transfer tube and into an ionization source. In one example, the carrier gas is a dry carrier gas. In another example, the carrier gas is substantially free of any solvent. In another example, the carrier gas comprises oxygen, said oxygen being in excess.

In another embodiment, the ionization is carried out by atmospheric pressure chemical ionization.

In another embodiment, the method further comprises extracting the superoxide radical anion ($O_2.^-$) adduct from the ionized analyte flow prior to the detection step. In one example, the extraction step is carried out by ion-mobility spectrometry. For example, the ion-mobility spectrometry is selected from the group consisting of differential mobility spectrometry and high-field asymmetric waveform ion mobility spectrometry. For instance, the ion-mobility spectrometry is differential mobility spectrometry and is carried out at a compensation voltage selected to extract the superoxide radical anion ($O2.^-$) adduct from the ionized analyte flow.

In another embodiment, the mass spectrometry is tandem mass spectrometry (MS/MS).

In another embodiment, the target analyte is a metabolite of vitamin D. In one example, the metabolite of vitamin D is selected from the group consisting of 25-hydroxyvitamin $D_2$ and 25-hydroxyvitamin $D_3$.

In another embodiment, the target analyte is an estrogenic steroid or a metabolite thereof.

In one example, the estrogenic steroid is selected from the group consisting of estrone and estradiol.

In another embodiment, the target analyte is an anabolic-androgenic steroid or a metabolite thereof. In one example, the anabolic-androgenic steroid is selected from the group consisting of testosterone and a synthetic derivative of testosterone.

In another embodiment, the target analyte is an opioid or an active metabolite thereof. In one example, the opioid or the active metabolite of an opioid is selected from the group consisting of tramadol and 6-acetylmorphine.

In another embodiment, the target analyte is a phenolic compound. In one example, the phenolic compound is selected from the group consisting of alkylphenols and bisphenols.

For example, the alkylphenol is an octylphenol.

In another embodiment, the sample is a biological sample. In one example, the biological sample comprises at least one of human or animal excreta, secreta, blood and its components, tissue, tissue fluid swab and body parts. In another example, the biological sample is selected from the group consisting of human or animal blood, plasma, serum, oral fluids, urine and milk.

In another embodiment, the sample is an environmental sample. In one example, the environmental sample is selected from the group consisting of wastewater, natural water and drinking water.

According to another aspect, the present technology relates to a mass spectrometry system, comprising:

a laser diode thermal desorption (LDTD) ionization source configured to desorb at least a portion of a sample and to ionize the desorbed sample under conditions to generate an ionized analyte flow comprising a superoxide radical anion ($O_2.^-$) adduct detectable by negative ion mode mass spectrometry; and a mass spectrometer having an inlet in communication with the laser diode thermal desorption (LDTD) ionization source, the mass spectrometer being configured to detect the superoxide radical anion ($O_2.^-$) adduct.

In one embodiment, the mass spectrometer comprises a tandem mass spectrometer (MS/MS).

In another embodiment, the ionization source is an atmospheric pressure chemical ionization source. In one example, atmospheric pressure chemical ionization source comprises a corona needle.

In another embodiment, the laser diode thermal desorption ionization source comprises a transfer tube having a first end and a second end, the transfer tube being provided with a carrier gas flow to carry the desorbed sample through the transfer tube from the first end to the second end and into the ionization source, the ionization source being positioned downstream from the second end of the transfer tube.

In another embodiment, the distance between the second end of the transfer tube and the ionization source is in the range of from about 3.0 mm to 4.0 mm, limits included.

In another embodiment, the distance between the second end of the transfer tube and the inlet of the mass spectrometer is in the range of from about 4.5 mm to about 5.5 mm, limits included.

In another embodiment, the system further comprises an ion-mobility spectrometer in communication with the inlet of the mass spectrometer, the ion-mobility spectrometer being configured to receive at least a portion of the analyte flow from the ionization source and to extract the superoxide radical anion ($O_2.^-$) adduct from the ionized analyte flow.

In another embodiment, the mass spectrometer detects and quantifies the superoxide radical anion ($O_2.^-$) adduct in an output flow of the ion-mobility spectrometer.

In another embodiment, the ion-mobility spectrometer is selected from the group consisting of differential mobility spectrometer and high-field asymmetric waveform ion mobility spectrometer. In one example, the ion-mobility spectrometer is a differential mobility spectrometer and is carried out at a compensation voltage selected to extract the superoxide radical anion ($O_2.^-$) adduct from the ionized analyte flow.

According to another aspect, the present technology relates to a method for detecting at least one target analyte in a sample using negative ion mode mass spectrometry, the method comprising the steps of:

providing a sample prepared for mass spectrometry analysis;

desorbing at least a portion of the sample prepared for mass spectrometry analysis to obtain a desorbed sample;

ionizing the desorbed sample under conditions to generate an ionized analyte flow comprising a superoxide radical anion ($O_2.^-$) adduct detectable by negative ion mode mass spectrometry; and detecting the superoxide radical anion ($O_2.^-$) adduct by negative ion mode mass spectrometry to thereby detect the target analyte.

DETAILED DESCRIPTION

Figure 1:
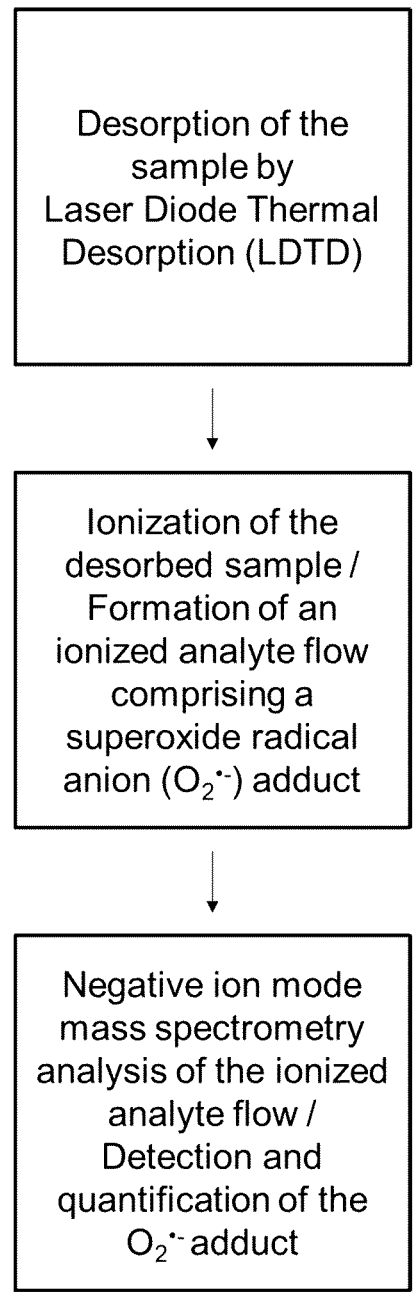
FIG. 1 is a flow diagram of a method for detecting a target analyte in a sample by a laser diode thermal desorption coupled with tandem mass spectrometry (LDTD-MS/MS) method according to one embodiment.

The following detailed description and examples are illustrative and should not be interpreted as further limiting the scope of the invention. On the contrary, it is intended to cover all alternatives, modifications and equivalents that can be included as defined by the present description. The objects, advantages and other features of the methods will be more apparent and better understood upon reading the following non-restrictive description and references made to the accompanying drawings.

All technical and scientific terms and expressions used herein have the same definitions as those commonly understood by the person skilled in the art when relating to the present technology. The definition of some terms and expressions used herein is nevertheless provided below for clarity purposes.

The chemical structures described herein are drawn according to conventional standards. Also, when an atom, such as a carbon atom as drawn, seems to include an incomplete valency, then the valency is assumed to be satisfied by one or more hydrogen atoms even if they are not necessarily explicitly drawn.

When the term "approximately" or its equivalent term "about" are used herein, it means around or in the region of. When the terms "approximately" or "about" are used in relation to a numerical value, it modifies it; for example, by a variation of 10% above and below its nominal value. This term may also take into account rounding of a number or the probability of random errors in experimental measurements; for instance, due to equipment limitations.

When a range of values is mentioned herein, the lower and upper limits of the range are, unless otherwise indicated, always included in the definition. When a range of values is mentioned in the present application, then all intermediate ranges and subranges, as well as individual values included in the ranges, are intended to be included.

As used herein, the term "alkyl" refers to saturated hydrocarbons having from one to ten carbon atoms, including linear or branched alkyl groups. Examples of alkyl groups may include, without limitation, methyl, ethyl, propyl, butyl, pentyl, hexyl, heptyl, octyl, nonyl, decyl, isopropyl, tert-butyl, sec-butyl, isobutyl, and the like. When the alkyl group is located between two functional groups, then the term alkyl also encompasses alkylene groups such as methylene, ethylene, propylene, and the like.

For more clarity, the expressions "primary carbon", "secondary carbon", "tertiary carbon" and "quaternary carbon" as used herein respectively refer to a carbon atom bound to one, two, three and four other carbon atom(s).

As used herein the expressions "primary alcohol", "secondary alcohol" and "tertiary alcohol", respectively refer to a compound in which a hydroxyl group (—OH) is bound to a saturated carbon atom and to one, two and three other carbon atom(s).

As used herein, the term "carboxamides" refers to functional groups of formula RC(=O)NR'R", wherein R, R', and R" are each independently selected from an organic substituent and a hydrogen atom.

As used herein, the expression "laser diode thermal desorption (LDTD) ionization source" refers to a direct-ionization source that can be coupled directly to a mass spectrometer without prior chromatographic separation.

As used herein, the expression "operating in negative ion mode" refers to various mass spectrometry methods where negative ions are generated, detected and optionally quantified.

The expression "detecting and quantifying" is used herein, however, it is to be understood that the method may be carried out by simply "detecting" an analyte, without necessarily quantifying it.

As used herein, the expression "limit of quantification (LOQ)" refers to the lowest amount or concentration of an analyte that can be quantitatively determined with a predefined precision and accuracy.

As used herein, the expression "limit of detection (LOD)" refers to the lowest quantity or concentration of an analyte that can be distinguished from the absence of that analyte.

Various analytical methods described herein are related to the detection, the identification and/or the quantification of at least one target analyte in a sample by negative ion mode mass spectrometry.

More particularly, the present technology relates to methods for detecting and quantifying at least one target analyte including at least one functional group capable of forming a superoxide radical anion ($O_2.^-$) adduct under negative-ion-generating mass spectrometric conditions. Non-limiting examples of functional groups capable of forming an $O_2.^-$ adduct under negative-ion-generating mass spectrometric conditions include alcohols, ketones, phenols, ethers, esters, large polarizable n-alkanes (approximately C18 and larger) and amides.

In some embodiments, the functional group capable of forming an $O_2.^-$ adduct under negative-ion-generating mass spectrometric conditions is selected for its ability to preferentially form the $O_2.^-$ adduct, rather than deprotonate, when exposed to such conditions. It is to be understood that, under negative-ion-generating mass spectrometric conditions, the target analyte mainly forms the $O_2.^-$ adduct, however, other ions such as $[M-1]^-$ ions obtained by deprotonation may also be formed in smaller quantity.

In some embodiments, the functional group capable of forming an $O_2.^-$ adduct under negative-ion-generating mass spectrometric conditions is selected from the group consisting of a tertiary alcohol, a phenol, a conjugated ketone and a carboxamide having an N—H functionality. In one variant of interest, the carboxamide may be an N-alkylacetamide having an N—H functionality. Without wishing to be bound by theory, N—H bearing carboxamides with acidities lower than that of hydrogen superoxide may preferentially form an $O_2.^-$ adduct under negative-ion-generating mass spectrometric conditions.

In some embodiments, two or more target analytes can be co-detected and co-quantified in a single assay. Alternatively, a single target analyte may be selectively detected and quantified while hindering the co-detection and co-quantification of other analytes.

In some embodiments, the sample may include a complex, a heterogeneous and/or an unknown sample matrix. For instance, the sample may be a biological sample, a food sample or an environmental sample.

In some embodiments, the sample is a biological sample and may be, for example, a biological material of human or animal origin, including but not limited to, excreta, secreta, blood and its components, tissue and tissue fluid swabs, hair, nail, breath, mucus, and body parts. Non-limiting examples of biological material include human or animal blood, plasma, serum, oral fluids, nasal mucus, skin excretion (including sweat), tears, meibum, urine and milk. In one example, the biological sample may be analyzed for research, diagnosis, investigational activities, disease treatment and/or preventive purposes. In another example, the biological sample may be analyzed for substance abuse testing, prescription drug monitoring, controlled substance monitoring, prodrug monitoring, toxicology testing and/or forensic testing.

In some embodiments, the sample is an environmental sample, including but not limited to, soils, drinking water, natural water, surface water, groundwater, wastewater, sewage sludge, effluent discharges, biosolids, sediments, air, wildlife and compost. In one example, the environmental sample is municipal wastewater or industrial wastewater such as effluent wastewater from the pharmaceutical, gas and oil, mining, agricultural, dairy, power generation, polymer production, chemical production and food production industries. In one example, the biological sample may be analyzed for research purposes, monitoring environmental contaminants, public health, contamination and pollution prevention and management.

In some embodiments, the target analyte may be an endogenous organic compound (for example, potential biomarkers and hormones) or an exogenous organic compound (for example, drugs and environmental contaminants). Non-limiting examples of target analytes include steroids, secosteroids, anabolic-androgenic steroids, steroid hormones, hormones, prehormones, opioids (narcotic), analgesics, xenohormones, xenoestrogens and their metabolites. For example, the target analyte may be an organic compound present in the composition of various drugs of abuse, doping agents, pharmaceuticals, dietary supplements, personal-care products, detergents, fuel additives, lubricants, polymers and phenolic resins.

In some embodiments, the target analyte is vitamin D or a metabolite thereof. Non-limiting examples of vitamin D metabolites include hydroxyvitamin D and dihydroxyvitamin D, which may be produced by the hydroxylation of vitamin D in the liver and the kidney. For example, the target analyte may be selected from the group consisting of 25-hydroxyvitamin $D_2$, 25-hydroxyvitamin $D_3$, 1,25-dihydroxyvitamin $D_2$ and 1,25-dihydroxyvitamin $D_3$. In one variant of interest, the target analyte is a metabolite of vitamin D selected from the group consisting of 25-hydroxyvitamin $D_2$ and 25-hydroxyvitamin $D_3$.

In some embodiments, the target analyte is an estrogenic steroid or a metabolite thereof. Non-limiting examples of estrogenic steroids include estrone, estradiol, estriol and estetrol. In one variant of interest, the target analyte is an estrogenic steroid selected from the group consisting of estrone and estradiol.

In some embodiments, the target analyte is an anabolic-androgenic steroid or a metabolite thereof, including but not limited to, testosterone, testosterone analogs and synthetic derivatives of testosterone. Non-limiting examples of anabolic-androgenic steroids include testosterone, methandienone, methyltestosterone, oxandrolone, oxymesterone, boldenone, boldenone undecylenate, methenolone, trenbolone and nandrolone. In one variant of interest, the target analyte is an anabolic-androgenic steroid selected from the group consisting of testosterone and boldenone undecylenate.

In some embodiments, the target analyte is an opioid (narcotic), an opioid analgesic or an active metabolite thereof. Non-limiting examples of opioids, opioid analgesics and metabolites thereof include tramadol, desmetramadol, morphine and 6-acetylmorphine. In one variant of interest, the target analyte is an opioid, an opioid analgesic or an active metabolite thereof selected from the group consisting of tramadol and 6-acetylmorphine.

In some embodiments, the target analyte is a phenolic compound. For example, a phenolic compound is selected from the group consisting of alkylphenols and bisphenols. Non-limiting examples of alkylphenols and bisphenols include octylphenols, nonylphenols, dodecylphenols, bisphenol A (BPA) and bisphenol S (BPS). In one variant of interest, the target analyte is an octylphenol.

According to one aspect, the present technology relates to a method for detecting and quantifying at least one target analyte in a sample by negative ion mode mass spectrometry. For a more detailed understanding of the disclosure, reference is first made to FIG. 1, which provides a flow diagram of a method for detecting and quantifying at least one target analyte in a sample by negative ion mode mass spectrometry in accordance with a possible embodiment.

As illustrated in FIG. 1, the method for detecting and quantifying at least one target analyte in a sample by negative ion mode mass spectrometry includes the step of desorbing at least a portion of a previously provided sample prepared for mass spectrometry analysis to obtain a desorbed sample. In one variant of interest, the desorption step is carried out by LDTD. In accordance with some embodiments, the desorption step involves releasing an analyte from or through the surface of the sample and/or vaporizing the analyte into a gas-phase neutral analyte flow.

For example, any compatible method for preparing a sample for mass spectrometric analysis is contemplated. In some embodiments, the method may optionally include at least one sample preparation step, including but not limited to, a solvent extraction step (or a liquid-liquid extraction step) and a step of drying the sample prior to the desorption step. For example, the method may further include a step of drying the sample to remove any residual solvent and thereby obtaining the sample prepared for mass spectrometry. For instance, the method may include a step of pre-drying the sample to substantially remove or evaporate the solvent, thereby obtaining a pre-dried sample prior to the desorption step. Alternatively, the method may include drying the sample at the beginning of the desorption process.

In some embodiments, the method as herein described may significantly reduce the time involved in sample preparation, for example, by reducing or even eliminating the need for sample preparation steps commonly required for mass spectrometry analysis. For example, in some embodiments, the method as herein described does not include a chromatographic separation (or is free of a chromatographic separation) such as a liquid chromatography separation to remove potentially interfering species.

In some embodiments, the method as described herein may optionally include carrying the desorbed sample via a carrier gas flow through a transfer tube and into an ionization source. In some embodiments, the carrier gas flow is a dry gas carrier flow. In some embodiments, the carrier gas flow does not include a mobile phase and/or a solvent. In some embodiments, the carrier gas flow is an oxygen-containing carrier gas flow. In some embodiments, the carrier gas flow comprises oxygen in excess. In some embodiments, the carrier gas flow is air, which may be compressed air.

Still referring to FIG. 1, the method also includes ionizing at least a portion of the desorbed sample under conditions selected to generate an ionized analyte flow including a superoxide radical anion ($O_2.^-$) adduct that is detectable by negative ion mode mass spectrometry. For example, any compatible negative-ion-generating atmospheric pressure or vacuum chemical ionization conditions promoting $O_2.^-$ attachment is contemplated. In one variant of interest, the desorbed sample is subjected to a negative corona discharge to undergo APCI before being drawn into a mass spectrometer.

It is to be understood that, while the desorbed sample is ionized under conditions selected to generate an ionized analyte flow mainly including a $[M+O_2].^-$ adduct, the ionized analyte flow may further include other ions such as $[M-1]^-$ ion obtained by the deprotonation of the analyte.

As illustrated in FIG. 1, the method further includes detecting and quantifying the $O_2.^-$ adduct produced in the ionization step by negative ion mode mass spectrometry, to thereby detect and quantify the target analyte.

Negative ion mode mass spectrometry involves analyzing negatively charged ions and thereby determining a mass-to-charge ratio (m/z). For example, mass spectrometers suitable for determining m/z include a standalone mass spectrometer, which may be operatively coupled to an extraction device, such as an ion-mobility spectrometer (IMS).

Alternatively, the mass spectrometer can be a tandem mass spectrometer such as a triple quadrupole mass spectrometer (TQMS), an ion trap time-of-flight (trap-TOF) mass spectrometer or a quadrupole-quadrupole-time-of-flight (QqTOF) mass spectrometer.

For example, various compatible detection modes are contemplated to detect ions. For example, the selected ions may be detected by selective ion monitoring (SIM), which records the ion current at selected masses that are characteristic of the analyte of interest. Alternatively, mass transitions resulting from collision-induced dissociation or neutral loss may be monitored, for example, using multiple reaction mode (MRM) or selected reaction monitoring (SRM). Using MRM, a precursor ion and one or more fragment ions are selectively detected. In one variant of interest, the detection mode is MRM.

It is to be understood that using the method as herein described can allow for peaks at (m/z 32) for the $O_2.^-$, at (m/z [M+32].$^-$), and/or (m/z [M−1].$^-$) to be observed for the deprotonated target analyte.

Figure 2:
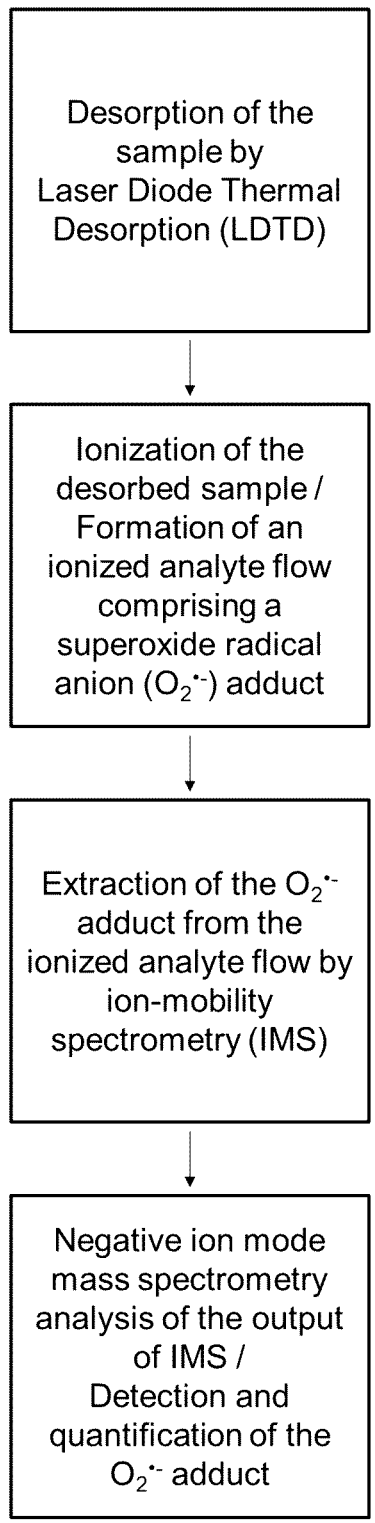
FIG. 2 is a flow diagram of a method for detecting a target analyte in a sample by an LDTD-MS/MS method according to another embodiment.

Reference is now made to FIG. 2 which provides a flow diagram of a method for detecting and quantifying at least one target analyte in a sample by negative ion mode mass spectrometry in accordance with another possible embodiment. As illustrated in FIG. 2, the method for detecting and quantifying at least one target analyte in a sample by negative ion mode mass spectrometry includes all the steps previously described in relation to FIG. 1 and further includes extracting the $O_2.^-$ adduct from the ionized analyte flow prior to the detection and quantification steps.

For example, any compatible extraction method is contemplated. In some embodiments, the extraction step may be carried out using ion-mobility spectrometry (IMS).

As shown in FIG. 2, the method can include desorbing at least a portion of a previously provided sample prepared for mass spectrometry analysis by LDTD to obtain a desorbed sample. The method also includes ionizing at least a portion of the desorbed sample under conditions required to generate an ionized analyte flow including an $O_2.^-$ adduct that is detectable by using negative ion mode mass spectrometry. The method also includes introducing at least a portion of the ionized analyte flow into an ion-mobility spectrometer (IMS), and analyzing the output of the IMS by negative ion mode mass spectrometry to detect and quantify the $O_2.^-$ adduct, to thereby detect and quantify the target analyte.

In some embodiments, the IMS is selected from the group consisting of differential mobility spectrometry (DMS) and high-field asymmetric waveform ion mobility spectrometry (FAIMS). In one variant of interest, the IMS is differential mobility spectrometry (DMS).

In some embodiments, the DMS is carried out at a compensation voltage selected to extract the $O_2.^-$ adduct from the ionized analyte flow. By way of example, the compensation voltage of the DMS can be selected to preferentially transmit the target analyte of interest. For example, the compensation voltage can respectively be set to about 11.1 V and about 10.2 V to preferentially convey 25-hydroxyvitamin $D_2$ and 25-hydroxyvitamin $D_3$ to a downstream mass spectrometer.

Figure 3:
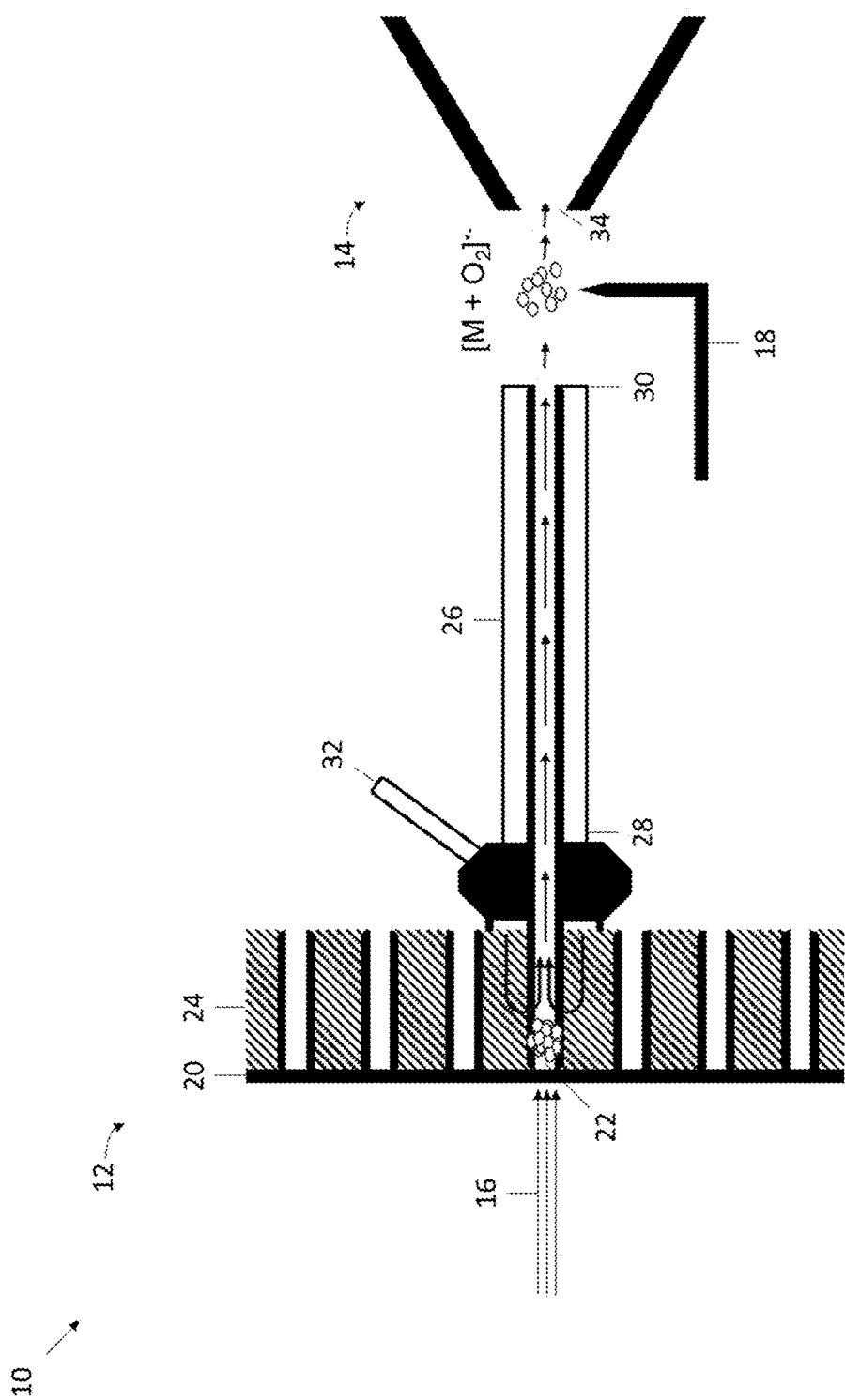
FIG. 3 is a schematic representation of an LDTD-MS/MS system according to one embodiment.

For a more detailed understanding of the disclosure, reference is made to FIG. 3, which provides a schematic representation of a mass spectrometry system 10 in accordance with a possible embodiment. The mass spectrometry system 10 includes an LDTD ionization source 12 and a mass spectrometer 14.

In some embodiments, the LDTD ionization source 12 is configured to desorb at least a portion of a sample. As illustrated in FIG. 3, the LDTD ionization source 12 comprises an infrared laser diode 16 configured to transfer heat to a sample as herein defined, thereby thermally desorbing at least a portion of the sample as herein defined and/or vaporizing an analyte into a gas-phase neutral analyte flow. The LDTD ionization source 12 also comprises an ionization source 18 configured to ionize the desorbed sample under conditions to generate an ionized analyte flow comprising an $O_2.^-$ adduct detectable by negative ion mode mass spectrometry.

In some embodiments, an infrared beam or pulse produced by the infrared laser diode 16 of the LDTD ionization source 12 may be substantially focused on a metal base 20 (e.g. stainless steel) of a specific well 22 of a sample well plate 24 configured to hold the sample. In some embodiments, the sample well plate 24 is a specialty sample well plate designed for the LDTD technology. For example, the sample well plate 24 may be a high desorption efficiency (HDE) sample well plate (LazWell™, Phytronix Technologies, QC, Canada). For instance, the HDE sample well plate may be designed for samples containing a high ratio of solvents with low surface tensions and may hold a substantially large volume of sample in each well.

In some embodiments, the LDTD ionization source 12 further comprises a transfer tube 26 having a first end 28 and a second end 30, the transfer tube 26 being provided with a carrier gas line 32 supplying a carrier gas flow to carry the desorbed sample through the transfer tube 26 from the first end 28 to the second end 30 and into the ionization source 18 positioned downstream from the second end 30 of the transfer tube 26.

In some embodiments, the carrier gas of the carrier gas flow is selected to support the preferential formation of the $O_2.^-$ adduct detectable by negative ion mode mass spectrometry. In some embodiments, the carrier gas flow comprises a dry gas carrier. In some embodiments, the carrier gas flow does not include a mobile phase and/or a solvent. In some embodiments, the carrier gas flow is an oxygen-containing carrier gas flow. In some embodiments, the carrier gas flow comprises oxygen in excess. In some embodiments, the carrier gas flow is air, which may be compressed air.

In some embodiments, the ionization source 18 is an APCI source. For example, the APCI source comprises at least one highly charged electrode configured to create an electric field strong enough to form a corona discharge (i.e., an electrical discharge) to ionize a nearby gas-phase neutral analyte flow so as to generate an ionized analyte flow comprising an $O_2.^-$ adduct that is detectable by a negative ion mode mass spectrometer. In some embodiments, the ionization source 18 is an APCI source comprising a corona-needle ionizer (i.e., a needle-shaped electrode) and the ionization is performed by using a corona discharge (i.e., a single-electrode discharge).

In some embodiments, the distance between the second end 30 of the transfer tube 26 and the ionization source 18 is optimized to favorize the formation of the $O_2.^-$ adduct detectable by using negative ion mode mass spectrometry rather than the deprotonation of the target analyte. In some embodiments, the corona-needle ionizer comprises a positioning unit configured to adjust the position of the corona needle on the vertical and horizontal axis for ion source sensitivity and selectivity adjustments. For instance, the distance between the second end 30 of the transfer tube 26 and the ionization source 18 is in the range of from about 3.0 mm to 4.0 mm. In one variant of interest, the distance between the second end 30 of the transfer tube 26 and the ionization source 18 is about 3.5 mm.

Still referring to FIG. 3, the mass spectrometer 14 has an inlet 34 in communication with the LDTD ionization source 12. For example, the ionization source 18 is positioned near the inlet 34 of the mass spectrometer 14. In some embodiments, the distance between the second end 30 of the transfer tube 26 and the inlet 34 of the mass spectrometer 14 is optimized to ensure that the $O_2.^-$ adduct is detectable due to negative ion mode mass spectrometry staying stable until the mass spectrometry analysis. For instance, the distance between the second end 30 of the transfer tube 26 and the inlet 34 of the mass spectrometer 14 is in the range of from about 4.5 mm to about 5.5 mm. In one variant of interest, the distance between the second end 30 of the transfer tube 26 and the inlet 34 of the mass spectrometer 14 is about 5 mm.

In some embodiments, the desorbed sample may be drawn into the ionization source 18 where the desorbed sample is ionized in preparation for analysis in the mass spectrometer 14. The ionized analyte flow comprising an $O_2.^-$ adduct detectable by negative ion mode mass spectrometry is then drawn into the mass spectrometer 14 through the inlet 34, where the $O_2.^-$ adduct will be detected and quantified by negative ion mode mass spectrometry to thereby detect and quantify the target analyte.

In some embodiments, the mass spectrometer 14 is a standalone mass spectrometer, which may be operatively coupled to an optional extraction device (not shown in FIG. 3), such as an ion-mobility spectrometer (IMS). Alternatively, the mass spectrometer 14 can be a tandem mass spectrometer, such as a TQMS mass spectrometer, a trap-TOF mass spectrometer, and a QqTOF mass spectrometer.

In some embodiments, the $O_2.^-$ adduct may be detected and quantified by SIM. Alternatively, the $O_2.^-$ adduct may be detected and quantified by MRM or SRM. In one variant of interest, the $O_2.^-$ adduct is detected and quantified by MRM.

In some embodiments, the mass spectrometry system 10 may optionally further comprise an ion-mobility spectrometer (IMS) (not shown in FIG. 3). For example, the IMS may be positioned downstream from the ionization source 18 and upstream from the inlet 34 of the mass spectrometer 14. The IMS may be configured to receive at least a portion of the analyte flow from the ionization source 18 and to extract the $O_2.^-$ adduct from the ionized analyte flow in preparation for analysis in the mass spectrometer 14.

In some embodiments, at least one portion of the desorbed sample may be drawn into the ionization source 18, where the desorbed sample is ionized under conditions to generate an ionized analyte flow comprising an $O_2.^-$ adduct. At least one portion of the ionized analyte flow may then be drawn into the IMS, where the $O_2.^-$ adduct is extracted in from the ionized analyte flow in preparation for analysis in the mass spectrometer 14. The output flow of the IMS may then be drawn in the mass spectrometer 14, where the $O_2.^-$ adduct is extracted and may be detected and quantified using negative ion mode mass spectrometry to thereby detect and quantify the target analyte.

In some embodiments, the IMS is selected from the group consisting of DMS and FAIMS. In one variant of interest, the IMS is DMS.

In some embodiments, the DMS is carried out at a compensation voltage selected to extract the $O_2.^-$ adduct from the ionized analyte flow. By way of example, the compensation voltage of the DMS can be selected to preferentially transmit the target analyte of interest. For example, the compensation voltage can respectively be set to about 11.1 V and 10.2 V, to preferentially transmit 25-hydroxyvitamin $D_2$ and 25-hydroxyvitamin $D_3$ to a downstream mass spectrometer.

According to another example, the method as described herein may enable high-throughput quantitative analysis of the target compound. The method may provide at least one of an improved LOD, LOQ, sensitivity, selectivity, accuracy, precision, reliability, reproducibility and linearity compared to other MS-based analysis methods. The method may also provide at least one of a faster analysis time and reduce per sample analysis costs compared to other MS-based analytical techniques. The method may also reduce or eliminate potential interference specifics to individual compounds and/or the matrix. Moreover, the method may also avoid extensive sample preparation and separation steps that are commonly associated with MS-based assays. In addition, the LDTD ionization source may readily be implemented to an already existing mass spectrometer in order to expand its capability without having to purchase an entire new MS platform.

EXAMPLES

The following non-limiting examples are illustrative embodiments and should not be construed as further limiting the scope of the present invention. These examples will be better understood in conjunction with the accompanying figures.

Example 1—Sample Preparation for Mass Spectrometry Analysis a) Extraction Methods The samples were prepared for mass spectrometry analysis using an extraction method. The extraction was carried out by transferring 50 µL of a serum sample in an Eppendorf Tube™ having a volume of 1.5 mL. The serum sample was then fortified (or spiked) with 125 µL of a deuterated certified internal standard (ISTD) solution comprising 50 µg/mL of the deuterium labelled target analyte in methanol and was then added in the Eppendorf Tube™, at which point the sample was vortexed for about 10 seconds. 900 µL of hexane was introduced in the Eppendorf Tube™. The Eppendorf Tube™ was closed with a cap and the sample was then vortexed for about 30 seconds and centrifuged at 5 000 rpm for about 2 minutes. After centrifugation, 300 µL of the upper fraction was transferred in a 96 DeepWell™ plate and allowed to evaporate to dryness at room temperature under 40 psi of air pressure for about 5 minutes to produce a dried extract.

b) Sample Preparation for LDTD-MS/MS (Method 1)

The dried extract prepared in Example 1 (a) was reconstituted with 200 µL of ethanol and mixed using a vortex mixer. 6 µL of the reconstitution solution sample was spotted onto an HDE well plate (LazWell™, Phytronix Technologies, QC, Canada) and allowed to evaporate to dryness with convective air at a temperature of about 40° C. for about 5 minutes and analyzed according to the LDTD method conditions as described in Example 2.

c) Sample Preparation for LDTD-MS/MS (Method 2)

The dried extract prepared in Example 1 (a) was reconstituted with 100 µL of a solvent mixture comprising methanol and water (75:25 by volume) and mixed using a vortex mixer. 3 µL of the reconstitution solution sample was spotted onto an HDE well plate (LazWell™ Phytronix Technologies, QC, Canada) and allowed to evaporate to dryness with convective air at a temperature of about 40° C. for about 5 minutes and analyzed according to the LDTD method conditions as described in Example 2.

d) Sample Preparation for LC-MS/MS (for Comparative Purposes)

The dried extract prepared in Example 1 (a) was reconstituted with 100 μL of a solvent mixture comprising methanol and water (75:25 by volume) and mixed using a vortex mixer. The reconstitution solution sample was transferred in an injection vial and analyzed according to the liquid chromatography method conditions.

Example 2—Analysis a) Instrumental Methods for the Analysis of a Target Analyte by the LDTD-MS/MS Method as Described in the Present Application The dried samples prepared in Examples 1 (b) and 1 (c) were analyzed using a Luxon Ion Source LDTD-APCI ionization interface, controlled by a software (Phytronix Technologies, QC, Canada) installed on an AB Sciex QTRAP™ 5500 triple quadrupole system (Framingham, MA, USA) equipped with an AB Sciex SelexION™ DMS (Framingham, MA, USA), controlled by a software. The laser diode of the LDTD source was used to indirectly heat the dried sample and desorb (or vaporize) the target analyte into gas-phase neutral target analyte molecules. The gas-phase neutral target analyte molecules were carried at room temperature using a dry carrier gas flow (compressed air having oxygen in excess, without mobile phase solvents) through a transfer tube and into a negative corona discharge to undergo atmospheric pressure chemical ionization (APOI).

b) Laser Pattern Programing and Parameters for the Quantitative Analysis and/or Screening Analysis of 25-Hydroxyvitamin D by the LDTD-MS/MS as Described in the Present Application The laser pattern programing used in the quantitative analysis and/or screening analysis by mass spectrometry and deuterated ISTD was as follows:

0% laser power from t=0 s to t=0.1 s;

linearly ramping from 0% laser power to 55.0% laser power from t=0.1 s to t=6.0 s;

55.0% laser power from t=6.0 s to t=9.0 s; and

0% laser power from t=9.1 s to 12.0 s.

The optimized parameters for the quantitative analysis and/or screening analysis by mass spectrometry were as indicated in Table 1.

TABLE 1

| Optimized parameters for the LDTD-MS/MS method as described herein | |
|---|---|
| Carrier Gas Flow Rate (L/min) | 4.5 |
| Curtain Gas pressure (psi) | 20.0 |
| Collision Gas (psi) | 6 |
| Ion Source Voltage (V) | −3 500.0 |
| Declustering Potential (V) | −40.0 |
| Entrance Potential (V) | −10.0 |
| Collision Cell Exit Potential (V) | −15.0 |
| Separation Voltage (V) | 4 200.0 |
| DMS Offset | 50.0 |

$D_3$-25-hydroxyvitamin $D_2$ (6,19,19-$D_3$) was used as deuterated certified internal standard (ISTD) solution for the quantitative analysis of 25-hydroxyvitamin $D_2$ using the LDTD-MS/MS method as described herein. The mass-to-charge ratios (m/z ratios) of the selected precursor (parent) ion (Q1), the mass-to-charge ratios (m/z ratios) of the superoxide radical anion ($O2.^-$) (Q3), the optimized compensation voltage and collision energy obtained for the target analyte and its deuterated certified internal standard (ISTD) are as indicated in Table 2.

TABLE 2 m/z ratios, compensation voltage and collision energy for 25-hydroxyvitamin $D_2$ and $D_3$-25-hydroxyvitamin $D_2$ (6,19,19-$D_3$)

| Target analyte | Q1 m/z (Da) | Q3 m/z (Da) | Compensation voltage (V) | Collision energy |
|---|---|---|---|---|
| 25-Hydroxyvitamin $D_2$ | 444.200 | 32.000 | 11.100 | −35.0 |
| $D_3$-25-Hydroxyvitamin $D_2$ | 447.280 | 32.000 | 11.100 | −35.0 |

$D_6$-25-Hydroxyvitamin $D_3$ (26,26,26,27,27,27-$D_6$) was used as a deuterated certified internal standard (ISTD) solution for the quantitative analysis of 25-hydroxyvitamin $D_3$ using the LDTD-MS/MS method as described herein. The mass-to-charge ratios (m/z ratios) of the selected precursor (parent) ion (Q1), the mass-to-charge ratios (m/z ratios) of the superoxide radical anion ($O2.^-$) (Q3), the optimized compensation voltage and collision energy obtained for the target analyte and its deuterated certified internal standard (ISTD) are as indicated in Table 3.

TABLE 3 m/z ratios, compensation voltage and collision energy for 25-hydroxyvitamin $D_3$ and $D_6$-25-hydroxyvitamin $D_3$ (26,26,26,27,27,27-$D_6$)

| Target analyte | Q1 m/z (Da) | Q3 m/z (Da) | Compensation voltage (V) | Collision energy |
|---|---|---|---|---|
| 25-Hydroxyvitamin $D_3$ | 432.200 | 32.000 | 10.200 | −35.0 |
| $D_6$-25-Hydroxyvitamin $D_3$ | 438.280 | 32.000 | 10.200 | −35.0 | c) Quantitative Analysis and/or Screening Analysis of 25-Hydroxyvitamin $D_2$

The LDTD-MS/MS results were obtained for the 25-hydroxyvitamin $D_2$ prepared in Examples 1 (b) and 3 (c) using the instrumental method described in Example 2 (a) and the laser pattern programing and optimized parameters identified in Example 2 (b). The results obtained using the LDTD-MS/MS method as described herein were validated by liquid chromatography-tandem mass spectrometry (LC-MS/MS).

Figure 4:
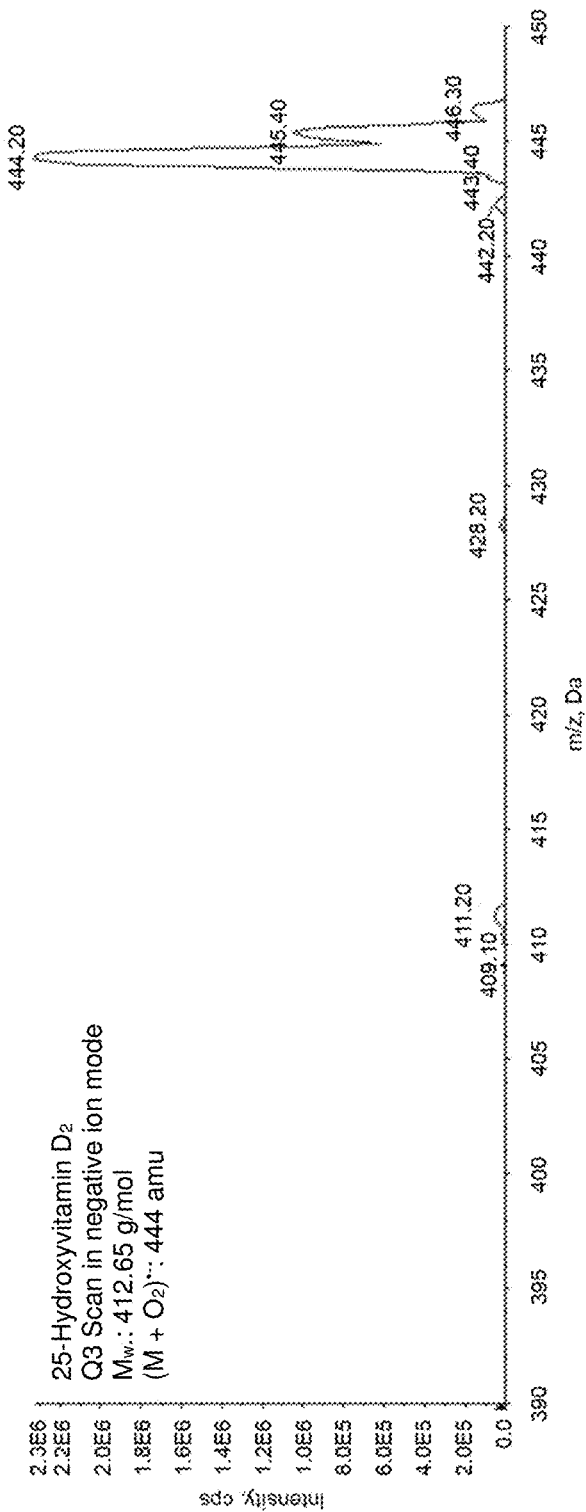
FIG. 4 is a mass spectrum obtained for 25-hydroxyvitamin $D_2$ in a serum sample, effectively a plot of the intensity in counts per second (cps) vs. the mass-to-charge ratio (m/z) in Dalton (Da), as described in Example 2 (c).

FIG. 4 presents a negative-ion mass spectrum obtained for 25-hydroxyvitamin $D_2$ in a serum sample. As can be seen in FIG. 4, 25-hydroxyvitamin $D_2$ preferentially forms superoxide radical anions $(O_2.^-)$ adduct rather than undergoing deprotonation under the negative-ion mass spectrometric conditions. Indeed, an intense signal can be observed at m/z 444 for the $(M+O_2).^-$ radical anion and fails to produce a significant peak for the $(M-H)^-$ ion. Without wishing to be bound by theory, the ionization pathway of 25-hydroxyvitamin $D_2$ under theses negative-ion mass spectrometric conditions may, for example, be as illustrated in Scheme 1:

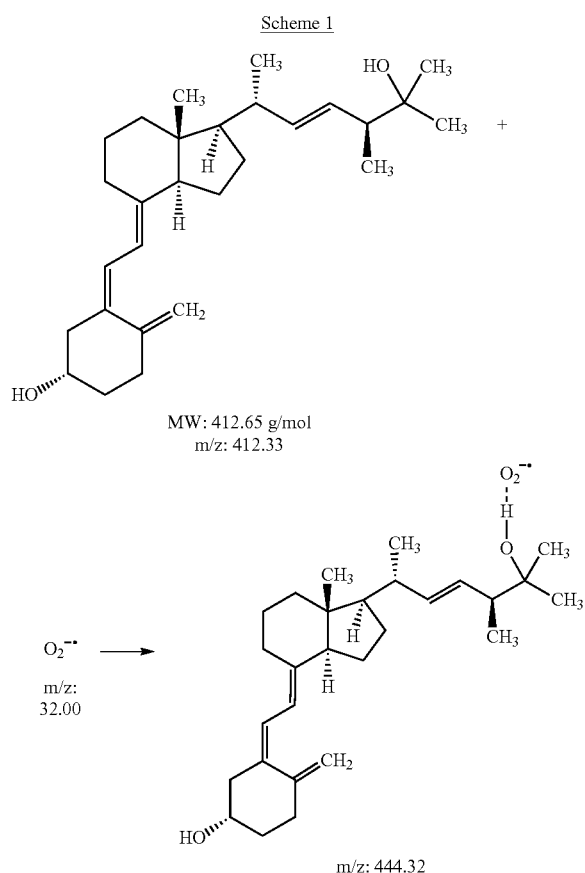

Figure 5:
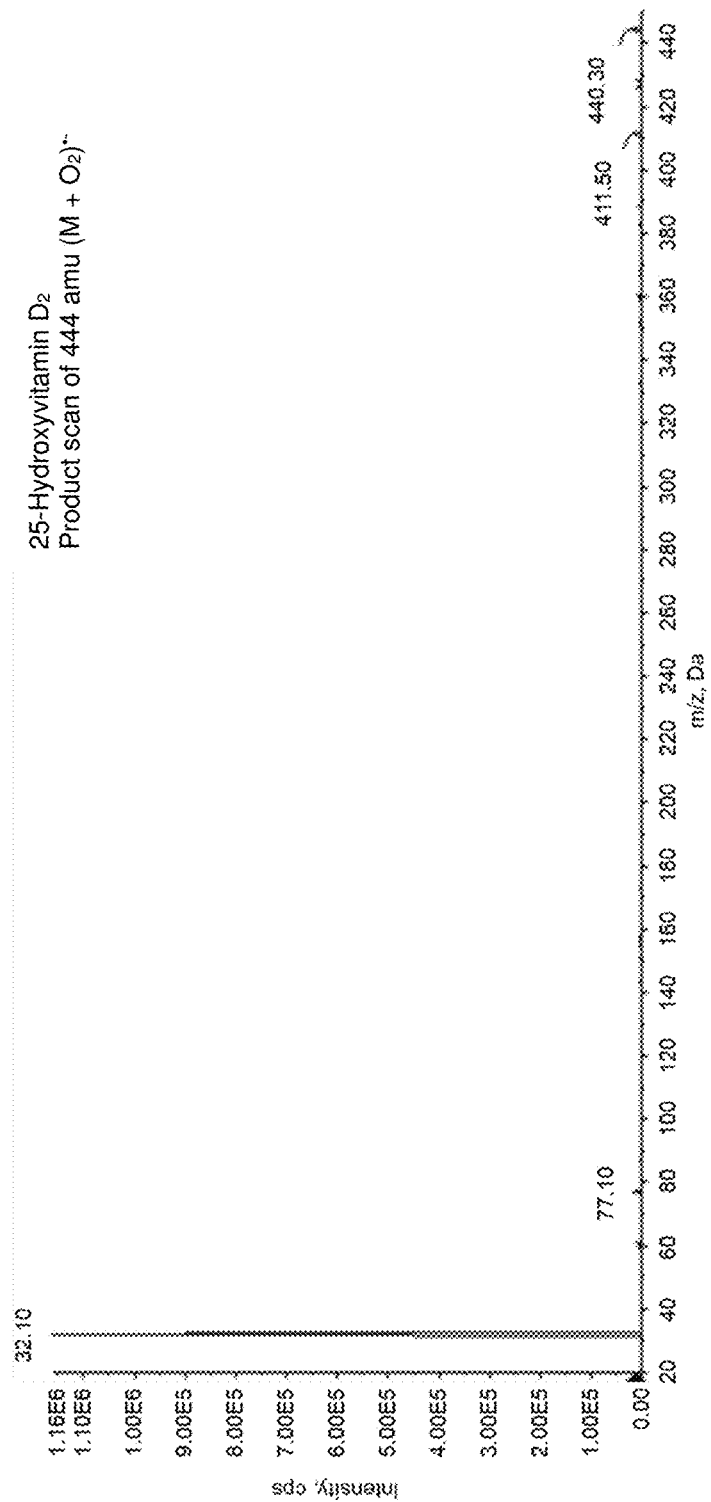
FIG. 5 is a product-ion mass spectrum recorded from m/z 444 amu ions generated from 25-hydroxyvitamin $D_2$ in a serum sample, effectively a plot of the intensity in cps vs. the m/z in Da, as described in Example 2 (c).

FIG. 5 presents a product-ion mass spectrum obtained for m/z 444 ion generated from 25-hydroxyvitamin $D_2$ in a serum sample. This product-ion mass spectrum recorded from $O_2.^-$ adduct of the 25-hydroxyvitamin $D_2$ supports the formation of said $O_2.^-$ adduct by showing a significant peak at m/z 32 for the superoxide radical anion.

Figure 6:
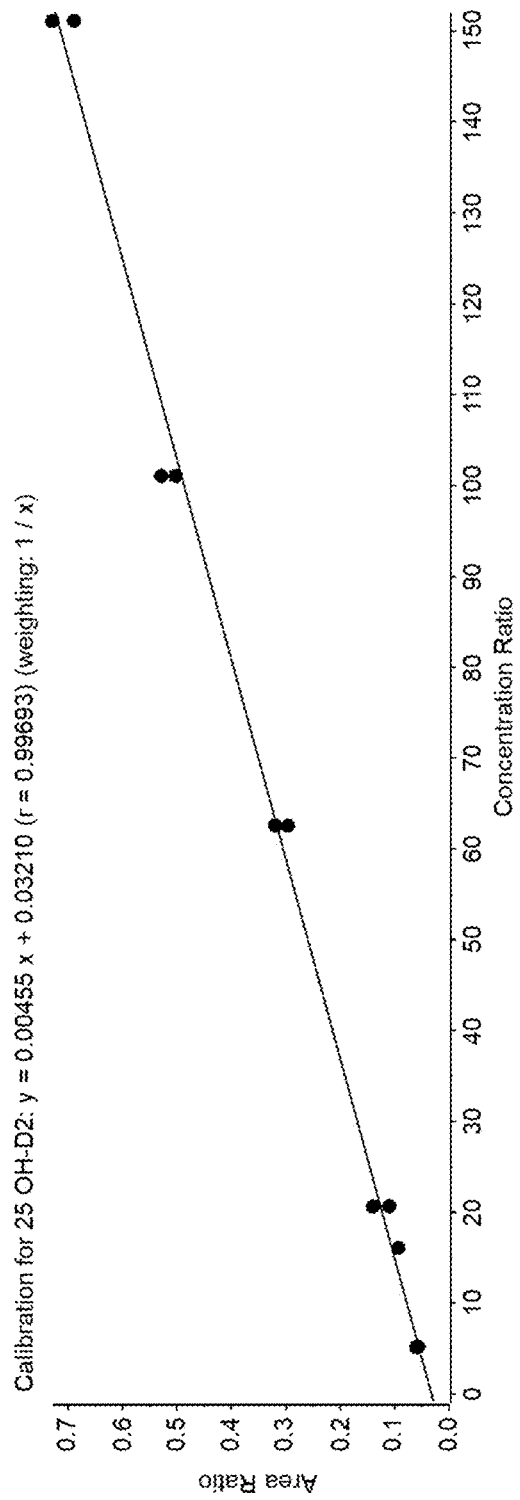
FIG. 6 is a calibration curve obtained for known concentrations of 25-hydroxyvitamin $D_2$ using $D_3$-25-hydroxyvitamin $D_2$ (6,19,19-$D_3$) as a certified internal standard in a serum sample, as described in Example 2 (c).

FIG. 6 presents a calibration curve obtained for known concentrations of 25-hydroxyvitamin $D_2$ using $D_3$-25-hydroxyvitamin $D_2$ (6,19,19-$D_3$) as a certified internal standard in a serum sample. The calibration curve was prepared by spiking the target analytes into a serum matrix spanning the intended calibration range of from about 5 ng/mL to about 150 ng/mL (about 2 orders of magnitude). Six non-zero standard samples of known concentrations were used to establish the calibration curve. As can be seen in FIG. 6, a simple linear regression model (y=mx+b) was used, and a weighted least squares model (1/x) was applied to the calibration range. The calibration curve demonstrates a substantially good linearity with a correlation coefficient (r value) of 0.99693.

The precision and accuracy were determined by analyzing three quality control (QC) serum samples with different analyte concentrations. Six replicates of each QC serum samples were analyzed. The precision and accuracy results for QC serum samples for 25-hydroxyvitamin $D_2$ are presented in Table 4.

TABLE 4

Quantitative analysis of 25-hydroxyvitamin $D_2$ in serum samples by LDTD-MS/MS

| QC sample identification | QCL-D2 | QCM | QCH |
| --- | --- | --- | --- |
| Target analyte | 25(OH)$D_2$ | 25(OH)$D_2$ | 25(OH)$D_2$ |
| Nominal concentration (ng/mL) | 16.08 | 22.87 | 101.46 |
| Number of replicates prepared | 6 | 6 | 6 |
| Mean measured concentration(ng/mL) | 15.4 | 23.8 | 111.1 |
| Standard deviation | 1.8 | 2.8 | 3.4 |
| Precision (% CV) | 11.53 | 11.74 | 3.02 |
| Accuracy (% nominal) | 95.97 | 103.89 | 109.53 |

The assessment of the relative matrix effect was determined by comparing the variability (% CV) of the area under the peaks for 25-hydroxyvitamin $D_2$ and $D_3$-25-hydroxyvitamin $D_2$ (6,19,19-$D_3$) ISTD quantitative ions across the six replicates. As shown by the results presented in Table 4, the LDTD-MS/MS quantitative analysis of 25-hydroxyvitamin $D_2$ in serum samples produces significantly precise and accurate results. The average precision in serum represented by % CV is in the range of from 3.02% to 11.74%. The accuracy for 25-hydroxyvitamin $D_2$ in a serum ranges from 95.97% to 109.53%.

c) Quantitative Analysis and/or Screening Analysis of 25-Hydroxyvitamin $D_3$

The LDTD-MS/MS results were obtained for the 25-hydroxyvitamin $D_3$ prepared in Examples 1 (b) and 3 (c) using the instrumental method described in Example 2 (a) and the laser pattern programing and optimized parameters identified in Example 2 (b). The results obtained by the LDTD-MS/MS method as described herein were validated by LC-MS/MS.

Figure 7:
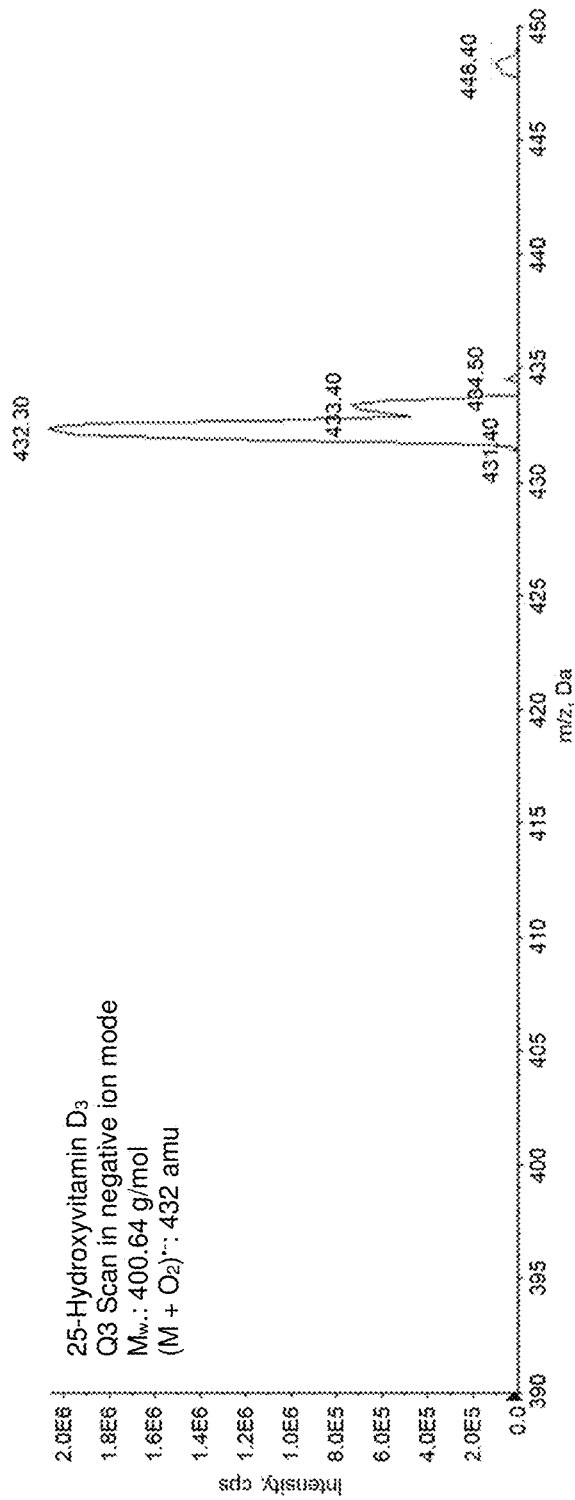
FIG. 7 is a mass spectrum obtained for 25-hydroxyvitamin $D_3$ in a serum sample, effectively a plot of the intensity in cps vs. the m/z in Da, as described in Example 2 (d).

FIG. 7 presents a negative-ion mass spectrum obtained for 25-hydroxyvitamin $D_3$ in a serum sample. As can be seen in FIG. 7, 25-hydroxyvitamin $D_3$ preferentially forms superoxide radical anions $(O_2.^-)$ adducts rather than undergoing deprotonation under negative-ion mass spectrometric conditions. Indeed, an intense signal can be observed at m/z 432 for the $(M+O_2).^-$ radical anion and fails to produce a significant peak for the $(M-H)^-$ ion. Without wishing to be bound by theory, the ionization pathway of 25-hydroxyvitamin $D_3$ may be, for example, as illustrated in Scheme 2 when under such negative-ion mass spectrometric conditions:

Scheme 2

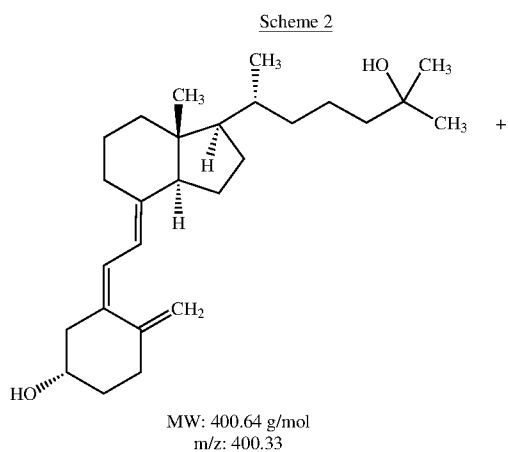

MW: 400.64 g/mol
m/z: 400.33

-continued

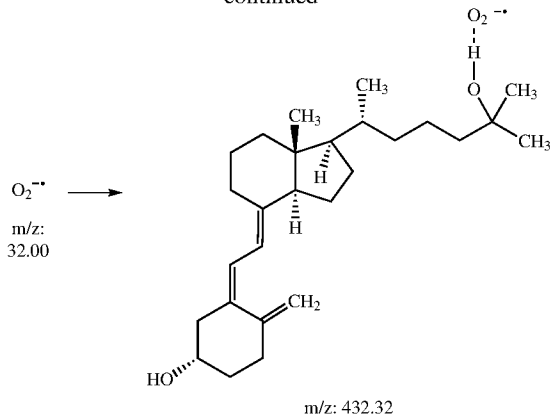

$O_2^{-\bullet}\longrightarrow$
m/z:
32.00 m/z: 432.32

Figure 8:
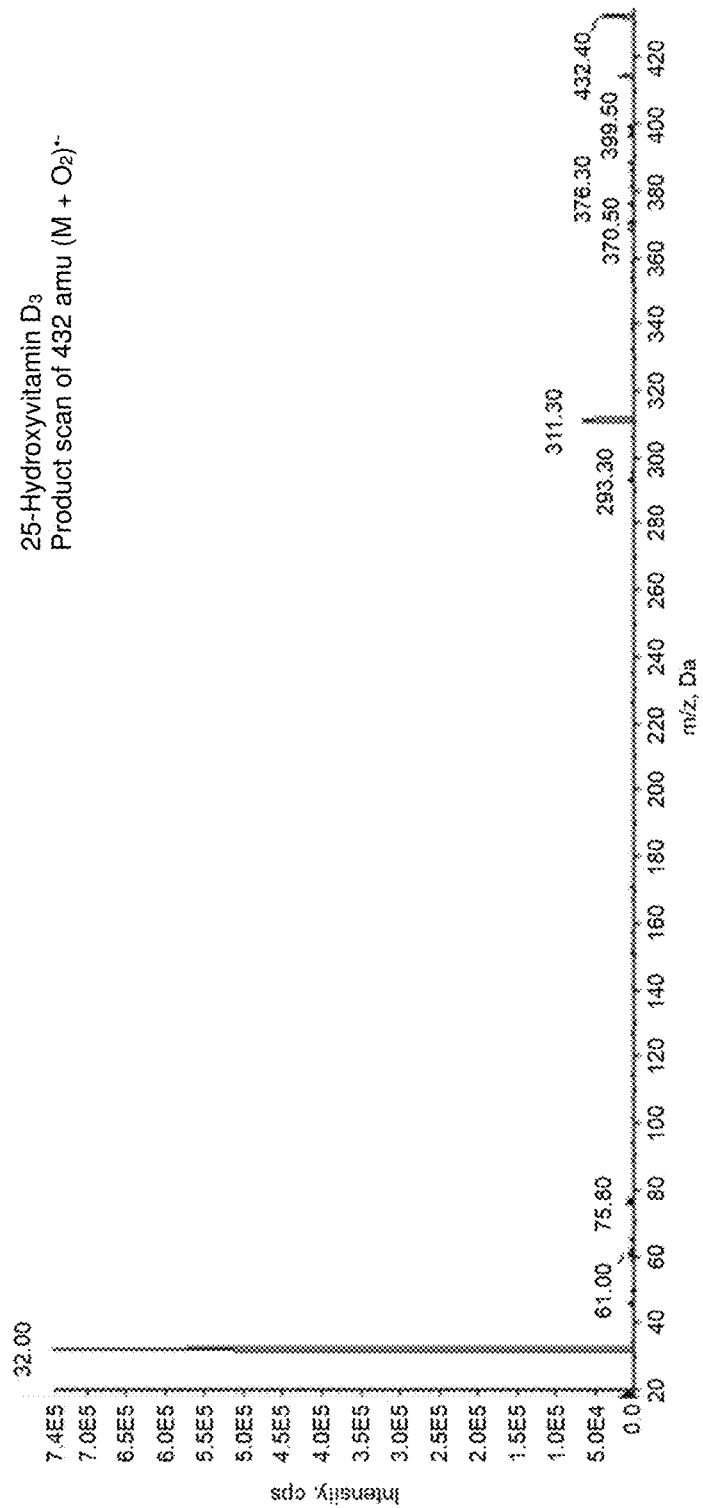
FIG. 8 is a product-ion mass spectrum recorded from m/z 432 amu ions generated from 25-hydroxyvitamin $D_3$ in a serum sample, effectively a plot of the intensity in cps vs. the m/z in Da, as described in Example 2 (d).

FIG. 8 presents a product-ion mass spectrum obtained for m/z 432 ion generated from 25-hydroxyvitamin $D_3$ in a serum sample. This product-ion mass spectrum recorded from $O_2^{-}$ adduct of the 25-hydroxyvitamin $D_3$ supports the formation of said $O_2^{-}$ adduct by showing a significant peak at m/z 32 for the superoxide radical anion.

Figure 9:
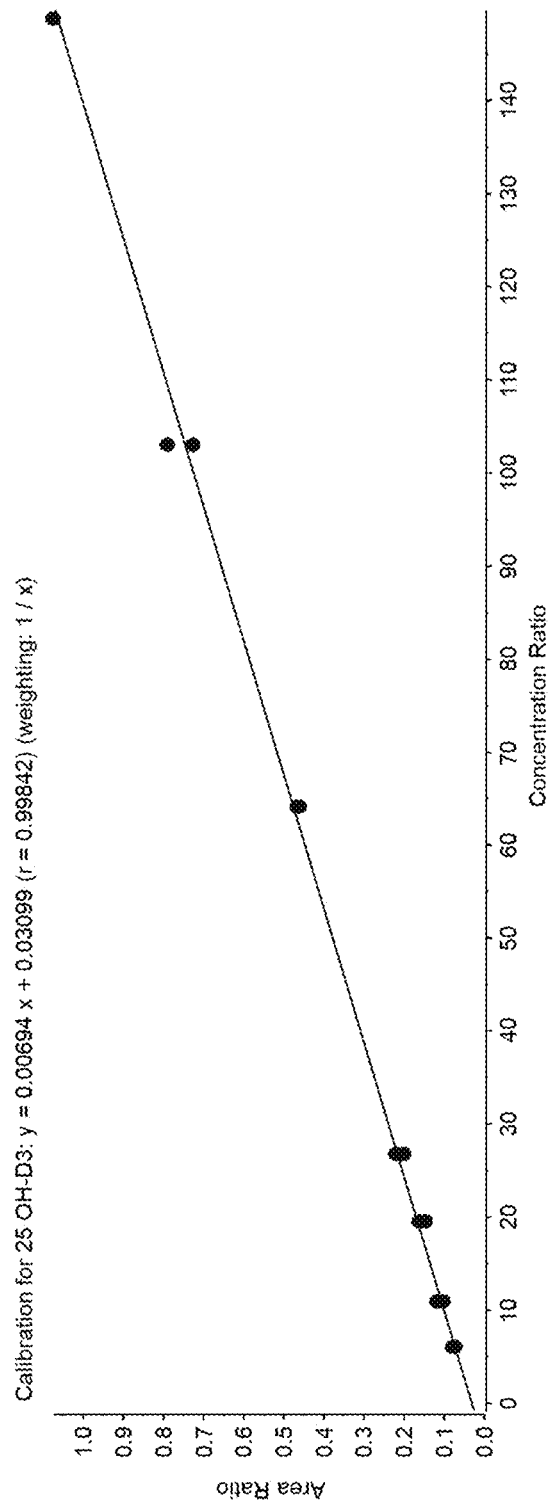
FIG. 9 is a calibration curve obtained for known concentrations of 25-hydroxyvitamin $D_3$ using $D_6$-25-hydroxyvitamin $D_3$ (26,26,26,27,27,27-$D_6$) as a certified internal standard in a serum sample, as described in Example 2 (d).

FIG. 9 presents a calibration curve obtained for known concentrations of 25-hydroxyvitamin $D_3$ using $D_6$-25-hydroxyvitamin $D_3$ (26,26,26,27,27,27-$D_6$) as a certified internal standard in a serum sample. The calibration curve was prepared by spiking the target analytes into a serum matrix spanning the intended calibration range of from about 5 ng/mL to about 150 ng/mL (about 2 orders of magnitude). Seven non-zero standard samples of known concentrations were used to establish the calibration curve. As can be seen in FIG. 9, a simple linear regression model (y=mx+b) was used, and a weighted least squares model (1/x) was applied to the calibration range. The calibration curve demonstrates a substantially good linearity with a correlation coefficient (r value) of 0.99842.

The precision and accuracy were determined by analyzing four QC serum samples with different analyte concentrations. Six replicates of each QC serum sample were analyzed. The precision and accuracy results for 25-hydroxyvitamin $D_3$ analyzed in serum are presented in Table 5.

TABLE 5

Quantitative analysis of 25-hydroxyvitamin $D_3$ in serum samples by LDTD-MS/MS

| QC sample identification | QCL-D3 | QCL-D2 | QCM | QCH |
|---|---|---|---|---|
| Target analyte | 25(OH)$D_3$ | 25(OH)$D_3$ | 25(OH)$D_3$ | 25(OH)$D_3$ |
| Nominal concentration (ng/mL) | 14.17 | 27.42 | 33.15 | 107.22 |
| Number of replicates prepared | 6 | 6 | 6 | 6 |
| Mean measured concentration(ng/mL) | 15 | 27.9 | 35.6 | 116.6 |
| Standard deviation | 0.8 | 1.2 | 2.4 | 4.3 |
| Precision (% CV) | 5.58 | 4.38 | 6.71 | 3.7 |
| Accuracy (% nominal) | 105.76 | 101.61 | 107.45 | 108.79 |

The assessment of the relative matrix effect was determined by comparing the variability (% CV) of the area under the peaks for 25-hydroxyvitamin $D_3$ and $D_6$-25-hydroxyvitamin $D_3$ (26,26,26,27,27,27-$D_6$) ISTD quantitative ions across the six replicates. As shown by the results presented in Table 5, the LDTD-MS/MS quantitative analysis of 25-hydroxyvitamin $D_3$ in serum samples produces significantly precise and accurate results. The average precision in serum is represented by a % CV in the range of from 3.7% to 6.71%. The accuracy for 25-hydroxyvitamin $D_3$ in serum ranges from 101.61% to 108.79%.

Statistical method comparison studies were performed to assess the comparability of between LDTD-MS/MS and LC-MS/MS, in other words, to evaluate a potential bias between the two methods.

Statistical method comparison studies were performed by analyzing four QC serum samples with different 25-hydroxyvitamin $D_3$ concentrations by using the two methods. The percentage difference between the two methods was evaluated using the absolute value of the difference between the concentration obtained when using LDTD-MS/MS versus the concentration obtained when using LC-MS/MS, which is then divided by the average of those two concentrations and multiplied by 100%, as outlined in Equation 1.

$$\text{percentage difference} = \left| \frac{LC \text{ result} - LDTD \text{ result}}{(LC \text{ result} + LDTD \text{ result})/2} \right| \times 100 \quad [\text{Eq. 1}]$$

The percentage difference results for 25-hydroxyvitamin $D_3$ in serum was analyzed using the two methods as presented in Table 6.

TABLE 6

Comparability between LDTD-MS/MS and LC-MS/MS

| QC sample identification | LDTD-MS/MS result 25(OH)$D_3$ (ng/mL) | LC-MS/MS result 25(OH)$D_3$ (ng/mL) | Percentage difference (%) |
| --- | --- | --- | --- |
| H2 | 28.1 | 29.2 | 3.7 |
| H3 | 21 | 20.8 | 0.9 |
| H4 | 29.6 | 26.6 | 10.8 |
| H5 | 29.1 | 28.9 | 0.8 |

The percentage difference between the criteria was set at <20%, and as can be seen in Table 6, the percentage difference between the two methods for the quantitative analysis of 25-hydroxyvitamin $D_3$ in serum samples was in the range of from 0.8% to 10.8%. The bias between the two methods was thus considered acceptable, meaning that the results obtained were similar and that the two methods may potentially be used interchangeably for this target analyte in serum samples.

The LDTD-MS/MS method as described in the present application was also compared to the method described in US'003 for comparative purposes. The samples were deposited onto the same analyzing plate.

Figure 10:
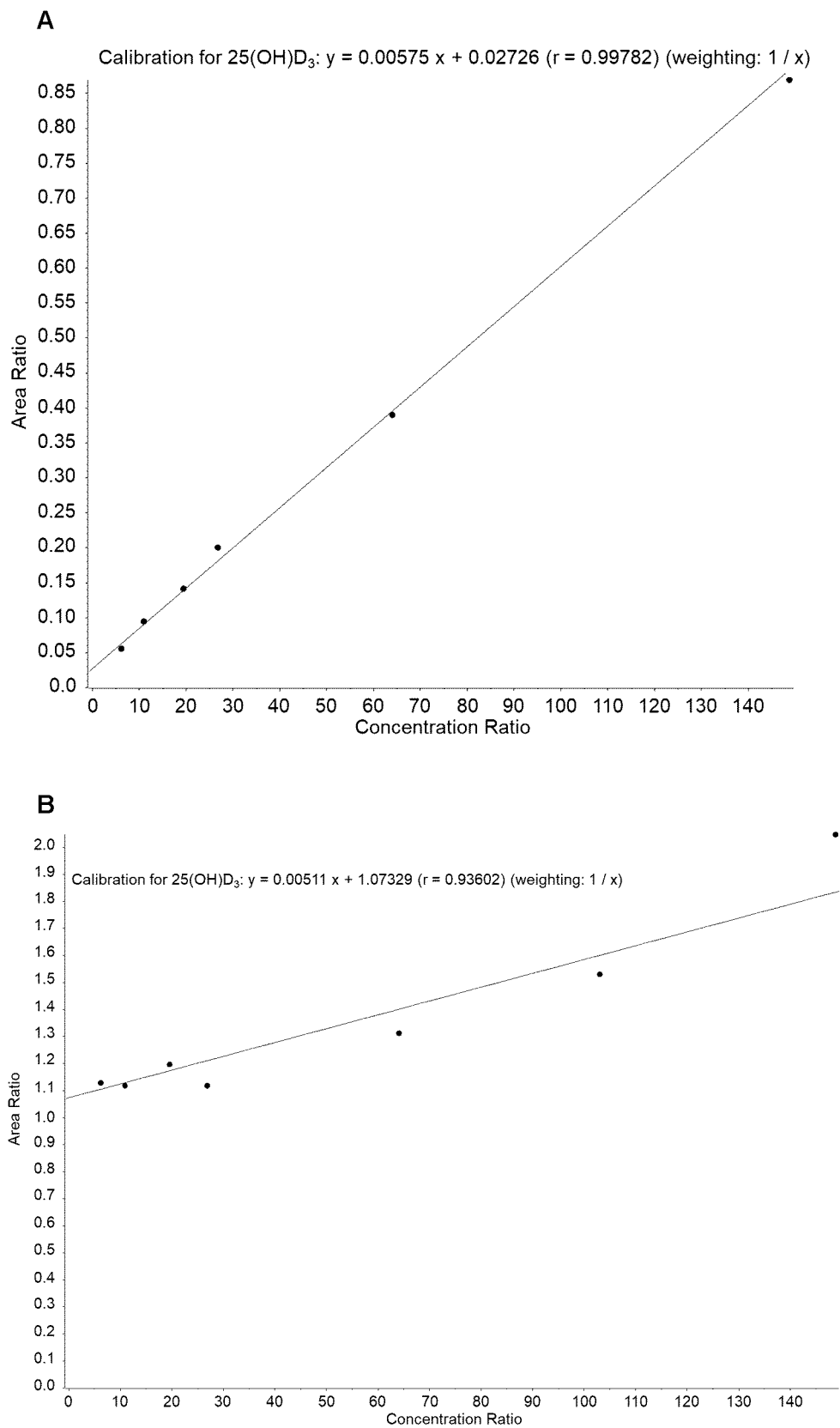
FIG. 10 presents a calibration curve obtained for known concentrations of 25-hydroxyvitamin $D_3$ using $D_6$-25-hydroxyvitamin $D_3$ (26,26,26,27,27,27-$D_6$) as a certified internal standard in a serum sample obtained in (A) by using an LDTD-MS/MS method according to one embodiment of the present application and in (B) by using an LDTD-MS/MS method described in US'003 (comparative method).

FIG. 10 (A) presents a calibration curve obtained for known concentrations of 25-hydroxyvitamin $D_3$ using $D_6$-25-hydroxyvitamin $D_3$ (26,26,26,27,27,27-$D_6$) as a certified internal standard in a serum sample obtained using the LDTD-MS/MS method of the present application. The calibration curve was prepared by spiking the target analytes into a serum matrix spanning the intended calibration range. Seven non-zero standard samples of known concentrations were used to establish the calibration curve. FIG. 10 (B) presents a calibration curve obtained for the same samples but obtained using the method described in US'003.

As can be seen in FIGS. 10 (A) and 10 (B), a simple linear regression model (y=mx+b) was used, and a weighted least squares model (1/x) was applied to the calibration range. The calibration curve in FIG. 10 (A) demonstrates a substantially good linearity with a correlation coefficient (r value) of 0.99782. As can be seen in FIG. 10 (B), the method described in US'003 fails to provide an adequate calibration curve (r=0.93602).

A comparison between the accuracy of the LDTD-MS/MS method as described in the present application and the method described in US'003 was also performed. The accuracy for both methods was determined by analyzing four QC serum samples with different analyte concentrations. Duplicates of each QC serum samples were analyzed. The accuracy results for 25-hydroxyvitamin $D_3$ analyzed in serum using both methods are presented in Table 7.

TABLE 7

Quantitative analysis of 25-hydroxyvitamin $D_3$ in serum samples by the LDTD-MS/MS of the present application and by the LDTD-MS/MS as described in US'003

| | | LDTD-MS/MS of the present application | | LDTD-MS/MS as described in US'003 | |
| --- | --- | --- | --- | --- | --- |
| QC sample identification. | Nominal conc. (ng/mL) | Measured conc. (ng/mL) | Accuracy (% nominal) | measured conc. (ng/mL) | Accuracy (% nominal) |
| QCL-$D_3$ | 14.2 | 14.5 | 102.0 | 213.3 | 1 505.2 |
| QCL-$D_3$ | 14.2 | 14.3 | 101.0 | 166.8 | 1 177.0 |
| QCL-$D_2$ | 27.4 | 27.4 | 99.8 | 296.7 | 1 082.1 |
| QCL-$D_2$ | 27.4 | 33.3 | 121.4 | 224.6 | 819.0 |
| QCM | 33.2 | 35.9 | 108.4 | 243.2 | 733.5 |
| QCM | 33.2 | 36.3 | 109.4 | 177.5 | 535.5 |
| QCH | 107.2 | 119.4 | 111.3 | 363.7 | 339.2 |
| QCH | 107.2 | 126.0 | 117.5 | 279.4 | 260.6 |

As can be seen in Table 7, the LDTD-MS/MS as described in US'003 was not able to provide an accurate quantitative analysis of 25-hydroxyvitamin $D_3$ in serum samples.

Figure 11:
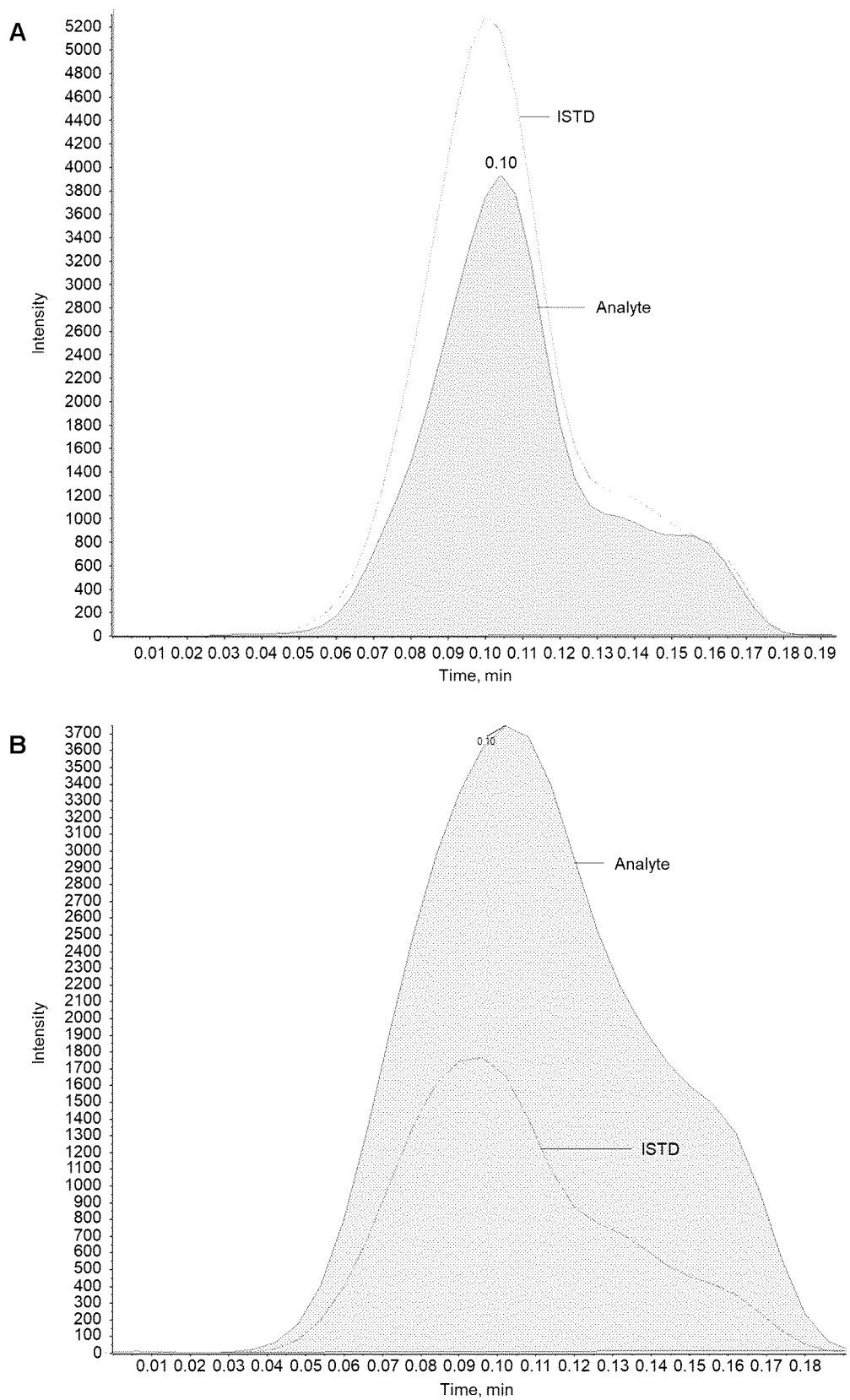
FIG. 11 presents graphs of the intensity plotted against time (min) for the target analyte as well as for the certified internal standard, as obtained in (A) by using an LDTD-MS/MS method according to one embodiment of the present application and in (B) by using the LDTD-MS/MS method described in US'003 (comparative method).

FIG. 11 presents graphs depicting the intensity plotted against time (min) for the target analyte as well as for the certified internal standard obtained in (A) using the LDTD-MS/MS method of the present application and in (B) using the LDTD-MS/MS method described in US'003 and as described in Example 2 (d). The target analyte/internal standard ratio was conserved for both methods and the same sample was analyzed using both methods. As can be observed in FIG. 11 (B), the matrix noise was several times greater than the target analyte signal, thereby rendering the quantitative analysis of the target analyte by the LDTD-MS/MS method described in US'003 unfeasible.

Figure 12:
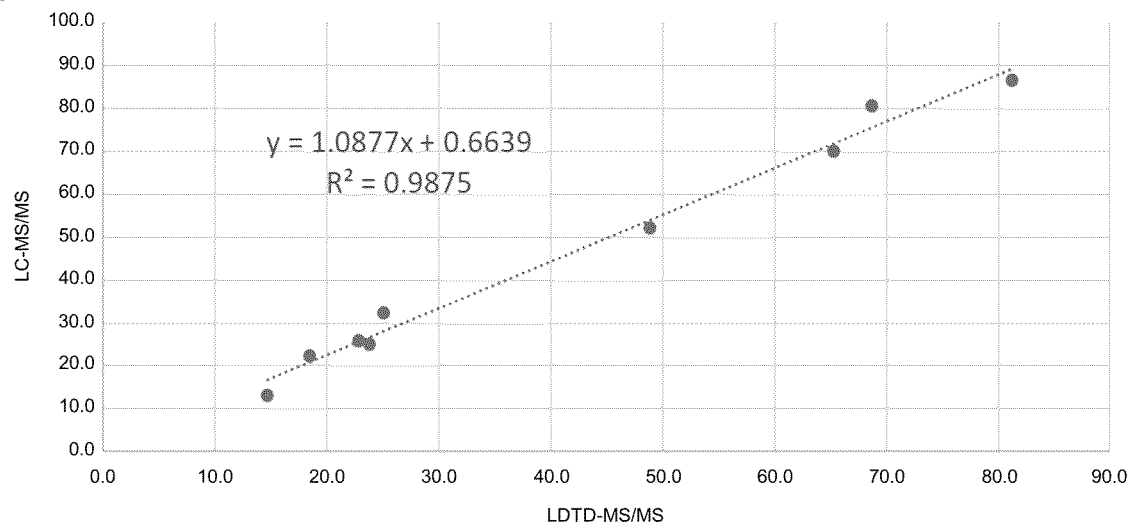
FIG. 12 presents scatter diagrams showing a set of paired values for a target analyte measured by liquid chromatography coupled with tandem mass spectrometry (LC-MS/MS) and an LDTD-MS/MS method for a quantitative analysis of 25-hydroxyvitamin $D_3$ and showing in (A) the linear relationship between the LC-MS/MS method and the LDTD-MS/MS method according to one embodiment of the present application and showing in (B) a linear relationship between the LC-MS/MS method and the LDTD-MS/MS method described in US'003 (comparative method).
Figure 12:
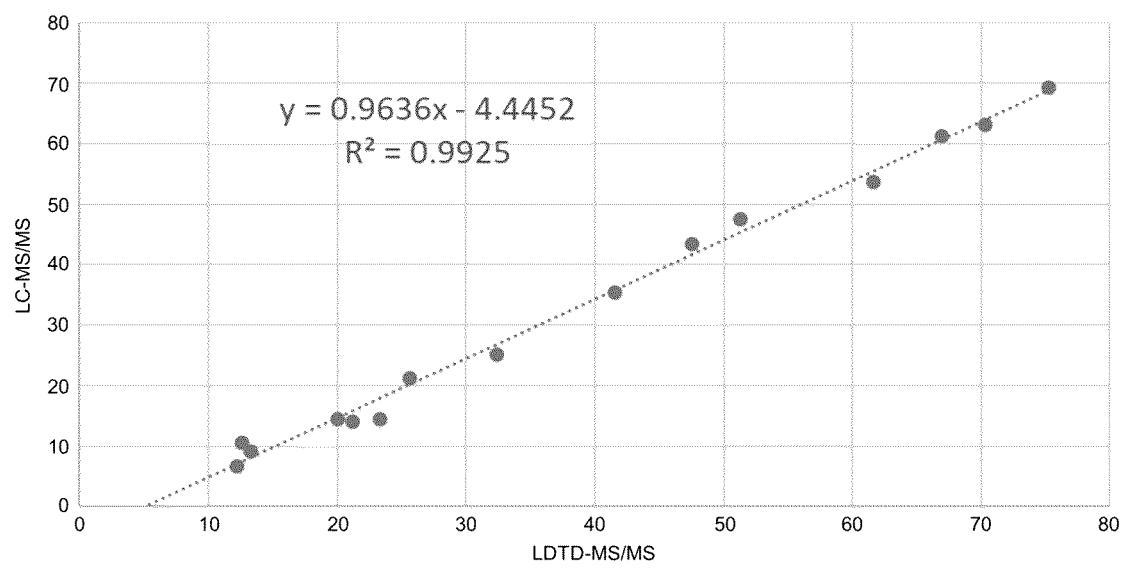

FIG. 12 presents a scatter diagram displaying the set of paired values for a target analyte measured by LC-MS/MS and by LDTD-MS/MS for the quantitative analysis of 25-hydroxyvitamin $D_3$ showing in (A) the linear relationship between LC-MS/MS and the LDTD-MS/MS method of the present application and in (B) the linear relationship between LC-MS/MS and the LDTD-MS/MS method described in US'003. As can be seen in FIG. 12 (A), no significant statistical bias between the LC-MS/MS and the LDTD-MS/MS method of the present application was observed, meaning that the obtained results were within the statistical variations. A significant systematic bias of 4.4 ng/mL was observed between the LC-MS/MS and the LDTD-MS/MS method described in US'003.

e) Quantitative Analysis and/or Screening Analysis of Several Target Analytes

Although only results obtained with 25-hydroxyvitamin $D_3$ and 25-hydroxyvitamin $D_2$ are presented, several other target analytes were analyzed using the LDTD-MS/MS method of the present application. The target analytes which were quantitatively analyzed by the negative ion mass spectrometry of the present application are indicated in Table 8.

TABLE 8

List of target analytes for quantitative analysis and/or screening analysis

| Target analyte | Functional group that allows the formation of an $O_2^{\bullet-}$ adduct | $O_2^{\bullet-}$ adduct Detection |
|---|---|---|
| 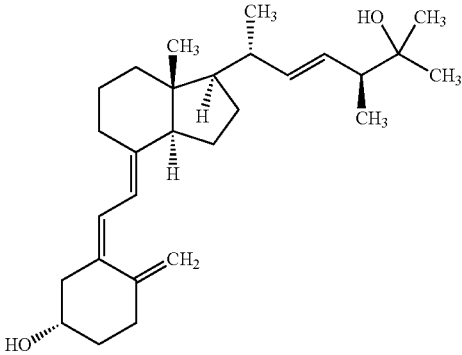  25-Hydroxyvitamin $D_2$ | Tertiary alcohol | Detected |
| 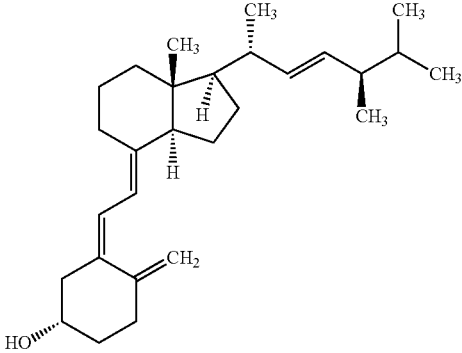  Ergocalciferol (vitamin $D_2$) | Absence of such functional group | NOT detected |
| 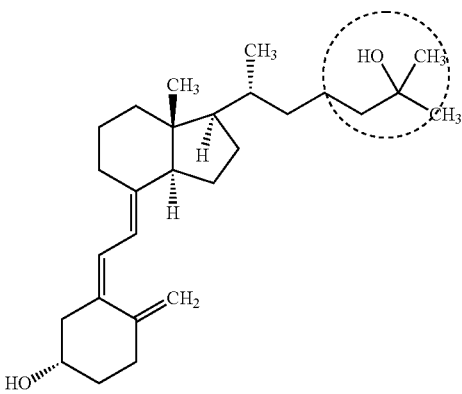  25-Hydroxyvitamin $D_3$ | Tertiary alcohol | Detected |

TABLE 8-continued

List of target analytes for quantitative analysis and/or screening analysis

| Target analyte | Functional group that allows the formation of an $O_2^{\cdot-}$ adduct | $O_2^{\cdot-}$ adduct Detection |
|---|---|---|
| 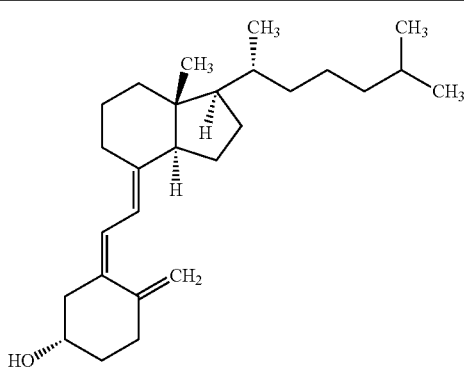 Cholecalciferol (Vitamin D₃) | Absence of such functional group | NOT detected |
| 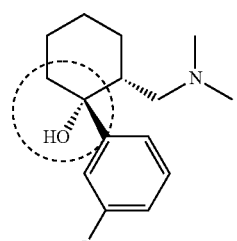 Tramadol | Tertiary alcohol | Detected |
| 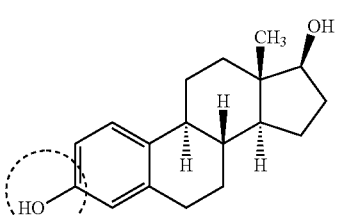 Estadiol (E2) | Phenol | Bimodal distribution of superoxide and deprotonation |
| 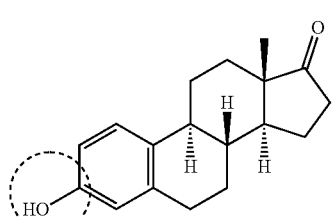 Estrone (E1) | Phenol | Bimodal distribution of superoxide and deprotonation |

TABLE 8-continued

List of target analytes for quantitative analysis and/or screening analysis

| Target analyte | Functional group that allows the formation of an $O_2^{\cdot-}$ adduct | $O_2^{\cdot-}$ adduct Detection |
|---|---|---|
| 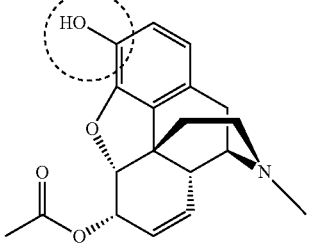<br>6-Acetylmorphine | Phenol | Bimodal distribution of superoxide and deprotonation |
| 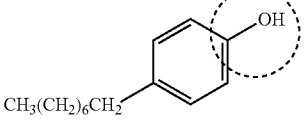<br>4-Octylphenol | Phenol | Bimodal distribution of superoxide and deprotonation |
| 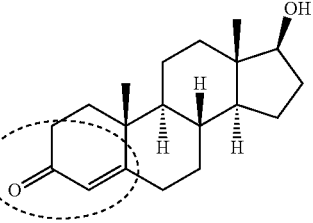<br>Testostenone | Conjugated ketone | Detected |
| 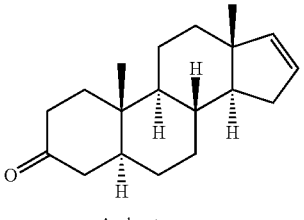<br>Androstenone | Absence of such functional group | NOT detected |
| 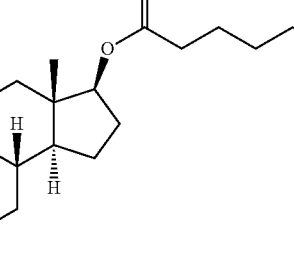<br>Boldenone undecylenate | Conjugated ketone | Detected |

TABLE 8-continued

List of target analytes for quantitative analysis and/or screening analysis

| Target analyte | Functional group that allows the formation of an $O_2^{\bullet-}$ adduct | $O_2^{\bullet-}$ adduct Detection |
|---|---|---|
| 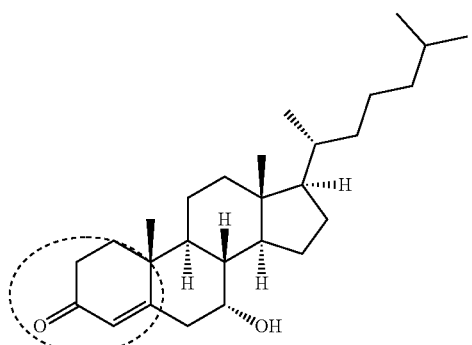<br>7α-Hydroxy-4-cholesten-3-one<br>•Isobar drug of 25-Hydroxyvitamin D$_3$ | Conjugated ketone | Detected but minor formation of daugther ion 32 |
| 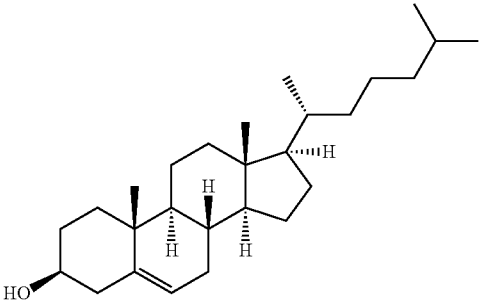<br>Cholesterol | Absence of such functional group | NOT detected |
| 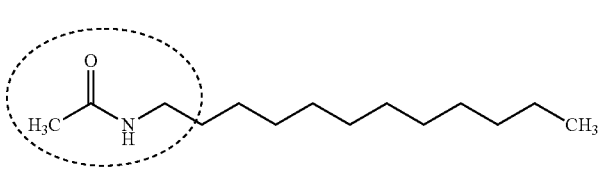<br>N-Dodecyl-acetamide | Carboxamide having an NH-functionality preferentially forming an $O_2^{\bullet-}$ adduct | Detected |
| 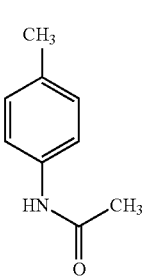<br>Toluacetaminide | Absence of such functional group | NOT detected |

TABLE 8-continued

List of target analytes for quantitative analysis and/or screening analysis

| Target analyte | Functional group that allows the formation of an $O_2^{\bullet-}$ adduct | $O_2^{\bullet-}$ adduct Detection |
|---|---|---|
| <br>Nordiazepam | Absence of such functional group | NOT detected |
| 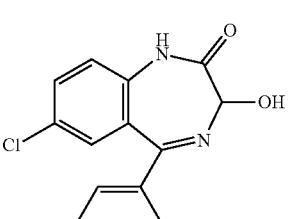<br>Oxazepam | Absence of such functional group | NOT detected |

Numerous modifications could be made to any of the embodiments described above without distancing from the scope of the present invention. Any references, patents or scientific literature documents referred to in the present application are incorporated herein by reference in their entirety for all purposes.

The invention claimed is:

1. A method for detecting at least one target analyte in a sample using negative ion mode mass spectrometry, the method comprising the steps of:
providing a sample prepared for mass spectrometry analysis;
desorbing at least a portion of the sample prepared for mass spectrometry analysis by laser diode thermal desorption (LDTD) to obtain a desorbed sample;
ionizing the desorbed sample under conditions to generate an ionized analyte flow comprising a superoxide radical anion ($O_2^{\bullet-}$) adduct detectable by negative ion mode mass spectrometry; and
detecting the superoxide radical anion ($O_2^{\bullet-}$) adduct by negative ion mode mass spectrometry to thereby detect the target analyte.

2. The method of claim 1, wherein the target analyte comprises at least one functional group selected from the group consisting of a tertiary alcohol, a phenol, a conjugated ketone and a carboxamide having an N—H functionality.

3. The method of claim 1, further comprising at least one of the following steps:
drying a sample to remove solvent, thereby obtaining the sample prepared for mass spectrometry;
carrying the desorbed sample by a carrier gas flow through a transfer tube and into an ionization source; and extracting the superoxide radical anion ($O_2^{\bullet-}$) adduct from the ionized analyte flow prior to the detection step.

4. The method of claim 1, wherein the ionization is carried out by atmospheric pressure chemical ionization (APCI).

5. The method of claim 3, wherein the extraction step is carried out by ion-mobility spectrometry (IMS).

6. The method of claim 5, wherein the ion-mobility spectrometry (IMS) is selected from the group consisting of differential mobility spectrometry (DMS) and high-field asymmetric waveform ion mobility spectrometry (FAIMS).

7. The method of claim 6, wherein the ion-mobility spectrometry (IMS) is differential mobility spectrometry (DMS) and is carried out at a compensation voltage selected to extract the superoxide radical anion ($O_2^{\bullet-}$) adduct from the ionized analyte flow.

8. The method of claim 1, wherein the mass spectrometry is tandem mass spectrometry (MS/MS).

9. The method of claim 1, wherein the target analyte is a metabolite of vitamin D, an estrogenic steroid or a metabolite thereof, an anabolic-androgenic steroid or a metabolite thereof, an opioid or an active metabolite thereof, or a phenolic compound.

10. The method of claim 1, wherein the sample is a biological sample or an environmental sample.

11. A mass spectrometry system, comprising:
a laser diode thermal desorption (LDTD) ionization source configured to desorb at least a portion of a sample and to ionize the desorbed sample under conditions to generate an ionized analyte flow comprising a superoxide radical anion ($O_2^{\bullet-}$) adduct detectable by negative ion mode mass spectrometry; and
a mass spectrometer having an inlet in communication with the laser diode thermal desorption (LDTD) ionization source, the mass spectrometer being configured to detect the superoxide radical anion ($O_2.^-$) adduct.

12. The system of claim 11, wherein the mass spectrometer comprises a tandem mass spectrometer (MS/MS).

13. The system of claim 11, wherein the ionization source is an atmospheric pressure chemical ionization (APCI) source preferably comprising a corona needle.

14. The system of claim 11, wherein the laser diode thermal desorption (LDTD) ionization source comprises a transfer tube having a first end and a second end, the transfer tube being provided with a carrier gas flow to carry the desorbed sample through the transfer tube from the first end to the second end and into the ionization source, the ionization source being positioned downstream from the second end of the transfer tube.

15. The system of claim 14, wherein the distance between the second end of the transfer tube and the ionization source is in the range of from about 3.0 mm to 4.0 mm, limits included.

16. The system of claim 14, wherein the distance between the second end of the transfer tube and the inlet of the mass spectrometer is in the range of from about 4.5 mm to about 5.5 mm, limits included.

17. The system of claim 11, further comprising an ion-mobility spectrometer (IMS) in communication with the inlet of the mass spectrometer, the ion-mobility spectrometer being configured to receive at least a portion of the analyte flow from the ionization source and to extract the superoxide radical anion ($O_2.^-$) adduct from the ionized analyte flow.

18. The system of claim 17, wherein the mass spectrometer detects and quantifies the superoxide radical anion ($O_2.^-$) adduct in an output flow of the ion-mobility spectrometer.

19. The system of claim 17, wherein the ion-mobility spectrometer is selected from the group consisting of differential mobility spectrometer (DMS) and high-field asymmetric waveform ion mobility spectrometer (FAIMS).

20. The system of claim 19, wherein the ion-mobility spectrometer (IMS) is a differential mobility spectrometer (DMS) and is carried out at a compensation voltage selected to extract the superoxide radical anion ($O_2.^-$) adduct from the ionized analyte flow.

21. A method for detecting at least one target analyte in a sample using negative ion mode mass spectrometry, the method comprising the steps of:
providing a sample prepared for mass spectrometry analysis;
desorbing at least a portion of the sample prepared for mass spectrometry analysis to obtain a desorbed sample;
ionizing the desorbed sample under conditions to generate an ionized analyte flow comprising a superoxide radical anion ($O_2.^-$) adduct detectable by negative ion mode mass spectrometry; and
detecting the superoxide radical anion ($O_2.^-$) adduct by negative ion mode mass spectrometry to thereby detect the target analyte.

\* \* \* \* \*